US011885402B2

(12) United States Patent
Payne et al.

(10) Patent No.: US 11,885,402 B2
(45) Date of Patent: Jan. 30, 2024

(54) GEARCASE ASSEMBLY AND METHOD

(71) Applicant: Transportation IP Holdings, LLC, Norwalk, CT (US)

(72) Inventors: Andrew Lee Payne, Mayville, NY (US); Scott Patrick Leute, Waterford, PA (US); Santosh Reddy Sama, Erie, PA (US); Uday Prakash Karmarkar, Erie, PA (US); Jaime de Jesus Garcia, Erie, PA (US); Dennis Richter, Norwalk, CT (US); Elizabeth Wooden, Farmington Hills, MI (US)

(73) Assignee: Transportation IP Holdings, LLC, Norwalk, CT (US)

( * ) Notice: Subject to any disclaimer, the term of this patent is extended or adjusted under 35 U.S.C. 154(b) by 124 days.

(21) Appl. No.: 17/364,484

(22) Filed: Jun. 30, 2021

(65) Prior Publication Data
US 2022/0010873 A1    Jan. 13, 2022

Related U.S. Application Data

(60) Provisional application No. 63/048,729, filed on Jul. 7, 2020.

(51) Int. Cl.
*F16H 57/029* (2012.01)
*F16J 15/3232* (2016.01)
(52) U.S. Cl.
CPC ........ *F16H 57/029* (2013.01); *F16J 15/3232* (2013.01)
(58) Field of Classification Search
CPC ............................ F16H 57/029; F16J 15/3232
See application file for complete search history.

(56) References Cited

U.S. PATENT DOCUMENTS 2,997,731 A * 8/1961 Schultz ............... A45D 34/041
401/213
3,710,646 A   1/1973 Bogan
(Continued)

FOREIGN PATENT DOCUMENTS

CN    208858927 U    5/2019
EA    200700295 A1   6/2007
(Continued)

OTHER PUBLICATIONS

Search Report for corresponding application No. 202191600 dated Feb. 18, 2022 (4 pages).
(Continued)

*Primary Examiner* — Thomas C Diaz
(74) *Attorney, Agent, or Firm* — Mary D. Lawlor; The Small Patent Law Group, LLC

(57) ABSTRACT

A gearcase seal assembly includes an inboard seal body and an outboard seal body both extending about and along a center axis between respective interior and exterior portions. The inboard and outboard seal bodies include respective inboard and outboard pockets configured to receive first and second surfaces of a gearcase of an axle assembly, respectively. The interior portions of the inboard and outboard seal bodies include respective gutters configured to direct fluid away from the first and second surfaces of the gearcase, respectively. The exterior portion of the inboard seal body includes plural fingers disposed outside of the inboard pocket and extending in one or more directions away from the inboard pocket. The exterior portion of the outboard seal body includes plural other fingers disposed outside of the outboard pocket and extending in one or more directions away from the outboard pocket.

20 Claims, 15 Drawing Sheets

(56) References Cited

U.S. PATENT DOCUMENTS

| | | | |
|---|---|---|---|
| 3,727,483 | A | 4/1973 | Hanson et al. |
| 3,955,506 | A * | 5/1976 | Luther .................... F42B 5/307 |
| | | | 102/467 |
| 4,337,954 | A | 7/1982 | Backlin et al. |
| 4,347,759 | A | 9/1982 | Renk et al. |
| 4,470,324 | A | 9/1984 | Renk et al. |
| 4,730,833 | A | 3/1988 | Foster et al. |
| 5,676,221 | A | 10/1997 | Renk et al. |
| 6,464,040 | B1 | 10/2002 | Hallmann et al. |
| 6,527,276 | B1 | 3/2003 | Phillips et al. |
| 8,056,902 | B2 | 11/2011 | Roddis et al. |
| 8,186,689 | B2 | 5/2012 | Miyazawa et al. |
| 2014/0157953 | A1 * | 6/2014 | Mishra .................. F16H 57/029 |
| | | | 74/606 R |

FOREIGN PATENT DOCUMENTS

| | | |
|---|---|---|
| KR | 101980881 B1 | 5/2019 |
| RU | 2009139263 A | 4/2011 |
| SU | 1695015 A1 | 11/1991 |

OTHER PUBLICATIONS

1Dffice Action for corresponding application No. 202191600 dated May 23, 2022 (6 pp.).
Office Action for corresponding AU Application No. 2021204729 dated Sep. 21, 2022 (7 pages).

\* cited by examiner

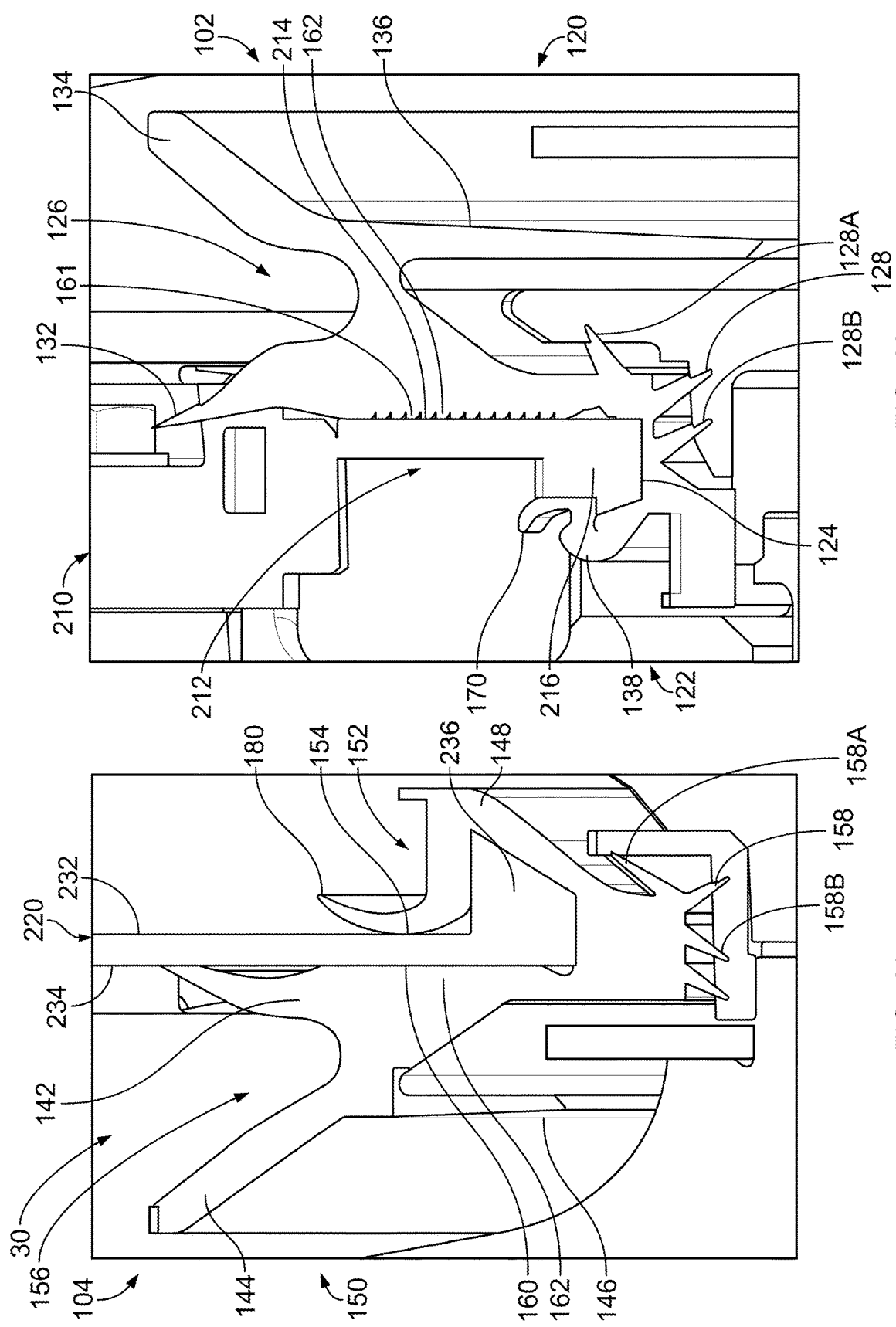

GEARCASE ASSEMBLY AND METHOD

CROSS-REFERENCE TO RELATED APPLICATIONS

This application claims priority to U.S. Provisional Application No. 63/048,729, filed Jul. 7, 2020, and is incorporated by reference herein in its entirety.

BACKGROUND

Technical Field

The subject matter described relates to axle gearcase assemblies and methods.

Discussion of Art

Gear and axle assemblies used, for example, by vehicle systems, include several moving and stationary components that convert energy provided by a motor into rotational motion of an axle to propel the vehicle system. FIGS. 1 through 8 illustrate plural different views of one example of an axle assembly 10. The axle assembly includes an axle 14 that extends along a center axis 38 with two wheels 12A, 12B disposed on either side of the axle 14, and a suspension unit 16 (e.g., a traction motor suspension unit or MSU, a UTUBE, or the like) and corresponding suspension unit bearing 18. A gear 30, such as a bull gear 30, is coupled with the axle 14. A motor 22 that includes a pinion 28, a pinion bearing 24, and a frame head 26 is coupled with the axle 14, such as by bolts. The pinion 28 is operably coupled with the gear 30 such that rotation of the pinion via the motor translates into rotation of the gear 30.

The gear and the pinion are enclosed within a gearcase 20 that extends around and encloses the gear and pinion. FIG. 2 illustrates a side view of the axle assembly. The wheel is hidden from view in FIG. 2 for clarity. The gearcase includes an upper gearcase portion 20A and a lower gearcase portion 20B that are coupled together (such as via bolts, weld joints, or the like). The gearcase surrounds or encloses the bull gear 30 and the pinion 28. The upper and lower gearcase portions come together at a split-line intersection that is substantially horizontal. For example, the split-line of the upper and lower portions extends in a substantially horizontal direction and through the center axis 38 of the axle and through a center axis of an axle of the motor 22.

The axle assembly includes plural seals that are disposed between the upper and lower gearcase portions 20A, 20B and at different intersections with the gearcase that are designed to contain lubricant inside the gearcase and to reduce an amount of debris or the like that may be allowed inside the gearcase. An outboard gutter seal 36 extends around the center axis 38, and a pinion seal 82 extends around a motor axis of the motor 22. FIG. 3 illustrates a partially exploded front view of the axle assembly. A gearcase seal 32 includes an inboard gutter seal 34 and the outboard gutter seal. The inboard gutter seal is disposed on an inside position of the gear 30 and between the gear 30 and the wheel 12A, and the outboard gutter seal is disposed on an outside position of the gear 30 between the gear and the wheel 12B.

FIG. 4 illustrates a magnified partial view of the inboard and outboard gutter seals 34, 36 extending around the gear 30 and FIG. 5 illustrates a perspective view of the inboard gutter seal of the axle assembly shown in FIG. 1. The inboard and outboard gutter seals may include one or more gasket seals 44, 46, 48, such as a silicone material or the like, that may be disposed at one or more seams along the inboard and/or outboard gutter seals and/or along one or more contact surfaces between the gutter seals and the gearcase.

FIG. 6 illustrates different levels of magnification of the outboard gutter seal 36 coupled with the gearcase 20 and disposed within the axle assembly. The outboard gutter seal includes a gutter lip 54 and a lip finger 56 that direct the lubricant toward an interface 50 between the gearcase and the gutter seal. The gutter seal also includes one or more fingers 52 that extend in different directions away from the interface 50 and reduce an amount of debris that may be directed into the gearcase. The outboard gutter seal extends 360 degrees about the center axis and has a substantially uniform design about the center axis and includes a split-line seal (such as illustrated in FIG. 5) to form a continuous outboard gutter seal after the outboard gutter seal is coupled with the axle assembly.

The outboard gutter seal may be sealed to the gearcase with silicone or the like disposed within the interface 50 and/or one or more other contact surfaces. Similarly, FIG. 7 illustrates different levels of magnification of the inboard gutter seal 34 coupled with the gearcase 20. The inboard gutter seal includes a gutter lip 64 and a lip finger 66 that direct the lubricant toward an interface 60 between the gearcase and the gutter seal. The inboard gutter seal extends 360 degrees about the center axis and has a substantially uniform design about the center axis and includes a split-line seal (illustrated in FIG. 5) to form a continuous inboard gutter seal after the inboard gutter seal is coupled with the axle assembly.

However, gearcase seal assemblies, such as the one illustrated in FIGS. 1 through 8, have plural technical problems. As one example, there may be adhesion and/or application failures at interfaces between the gutter seals and gearcase body causing lubricant to flow out of the gearcase and/or debris to move into the gearcase. As other examples, the split-line seal interfaces of the inboard and outboard gutter seals may separate, during operation and/or movement of the vehicle system, the inboard and/or outboard gutter seals may move away from the gearcase, lubricant that does move to a position between the gutter seals and surfaces of the gearcase remains trapped without a drain system, or the like. These technical problems may cause an amount of lubricant, such as oil, to leak out of the gearcase and/or an amount of debris to be let into the gearcase. A reduced amount of lubricant within the gearcase increases an amount of friction between the bull gear and the pinion. Additionally, an increase in an amount of debris that may be directed into the gearcase may move between and/or become caught between the bull gear and the pinion. These issues may cause the axle assembly to operate less efficiently, may require maintenance or repair in between scheduled service intervals, or may cause premature hardware failure.

BRIEF DESCRIPTION

In one or more embodiments, a gearcase seal assembly includes an inboard seal body extending about a center axis and along the center axis between an interior portion and an exterior portion. The inboard seal body includes an inboard pocket configured to receive a first surface of a gearcase of an axle assembly. The gearcase seal assembly includes an outboard seal body extending about the center axis and along the center axis between an interior portion and an exterior portion. The outboard seal body includes an outboard pocket configured to receive a second surface of the gearcase of the axle assembly. The interior portion of the inboard seal body includes a gutter configured to direct fluid in a direction away from the first surface of the gearcase. The exterior portion of the inboard seal body includes plural fingers disposed outside of the inboard pocket and extending in one or more directions away from the inboard pocket. The interior portion of the outboard seal body includes a gutter configured to direct fluid in a direction away from the second surface of the gearcase. The exterior portion of the outboard seal body includes plural fingers disposed outside of the outboard pocket and extending in one or more directions away from the outboard pocket.

In one or more embodiments, a gearcase assembly includes a gear configured to be coupled with an axle that extends along a center axis. Movement of the gear is configured to control movement of the axle. A gearcase is configured to contain the gear. The gearcase includes a body having at least a first surface and a second surface. The first surface is disposed on a first side of the gearcase and the second surface is disposed on a second side of the gearcase. A gearcase seal assembly includes an inboard seal body and an outboard seal body. The inboard seal body is disposed between the first surface of the gearcase and the gear, and the outboard seal body is disposed between the second surface of the gearcase and the gear. The gearcase seal assembly is configured to control an amount of the fluid that is directed out of the gearcase of the axle assembly, and to control an amount of debris from entering the gearcase of the axle assembly.

In one or more embodiments, a gearcase seal assembly includes an inboard seal body extending about a center axis and along the center axis between an interior portion and an exterior portion. The inboard seal body includes an inboard pocket configured to receive a first surface of a gearcase of an axle assembly. The gearcase seal assembly includes an outboard seal body extending about the center axis and along the center axis between an interior portion and an exterior portion. The outboard seal body includes an outboard pocket configured to receive a second surface of the a gearcase of the axle assembly. The interior portion of the inboard seal body includes a gutter configured to direct fluid in a direction away from the first surface of the gearcase. The exterior portion of the inboard seal body includes plural fingers disposed outside of the inboard pocket and extending in one or more directions away from the inboard pocket. The interior portion of the outboard seal body includes a gutter configured to direct fluid in a direction away from the second surface of the gearcase. The exterior portion of the outboard seal body includes plural fingers disposed outside of the outboard pocket and extending in one or more directions away from the outboard pocket. The inboard and outboard seal bodies are configured to control an amount of the fluid that is directed out of the gearcase of the axle assembly and to control an amount of debris from entering the gearcase of the axle assembly.

BRIEF DESCRIPTION OF THE DRAWINGS

The inventive subject matter may be understood from reading the following description of non-limiting embodiments, with reference to the attached drawings, wherein below:

FIG. 10 illustrates a partial cross-sectional view of an outboard seal body of the gearcase seal assembly shown in FIG. 9;

FIG. 11 illustrates a partial cross-sectional view of an inboard seal body of the gearcase seal assembly shown in FIG. 9;

DETAILED DESCRIPTION

Figure 1:
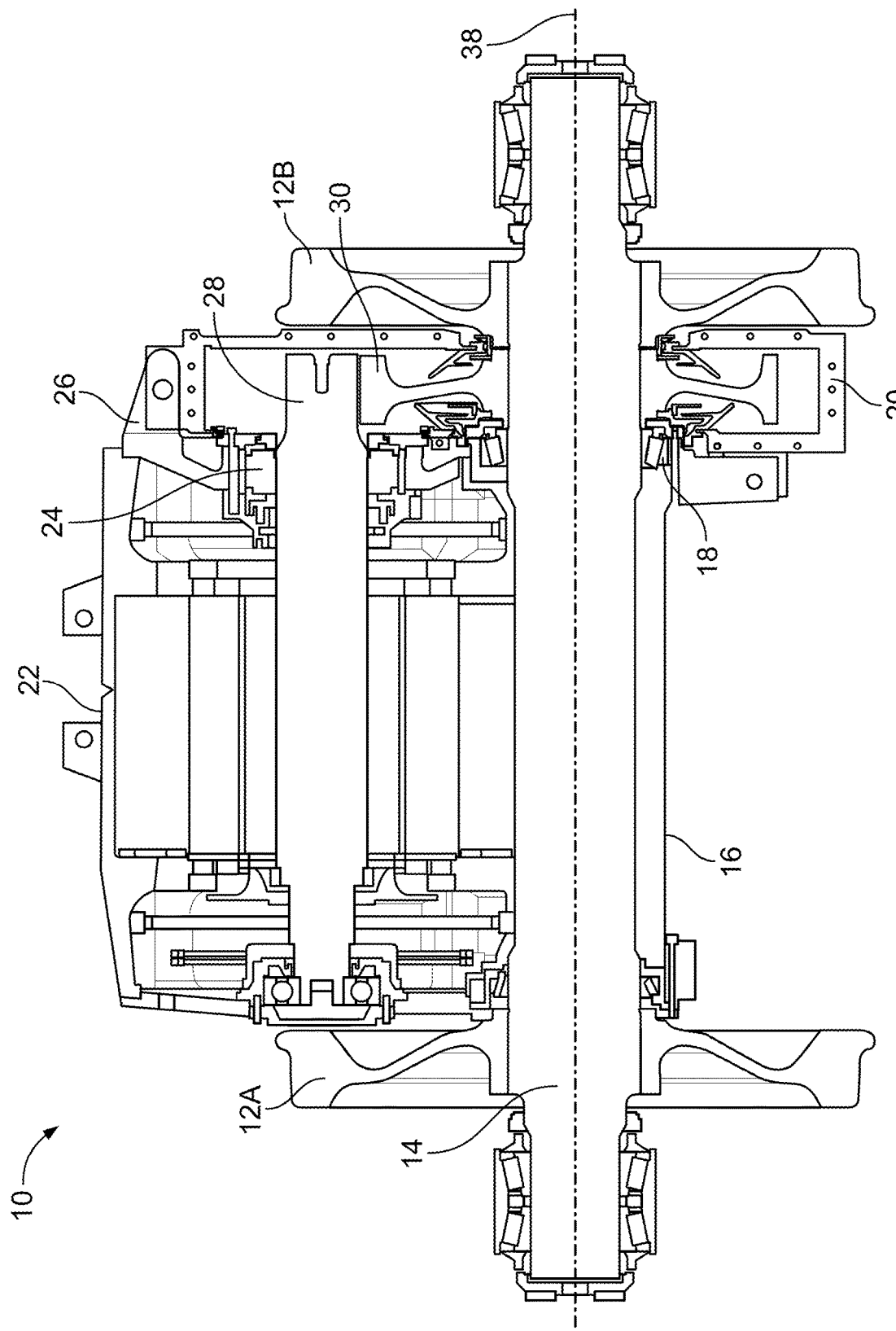
FIG. 1 illustrates a cross-sectional view of one example of an axle assembly.

Embodiments of the subject matter described herein relate to gearcase seal assemblies and methods that may be used within axle assemblies. The gearcase seal assembly may include an inboard seal body that extends around a center axis of an axle of the axle assembly and an outboard seal body that extends around the center axis of the axle of the axle assembly. The inboard and outboard seal bodies may be disposed between a gearcase that extends around and encloses a gear and a pinion of the axle assembly and one or more other surfaces of the axle assembly. For example, the inboard and outboard seal bodies may provide a seal or gasket at an interface between the gearcase and other surfaces of the axle assembly. An inboard pocket of the inboard seal body may receive a first portion of the gearcase, and an outboard pocket of the outboard seal body may receive another portion of the gearcase. The inboard seal body may include an interior portion that includes a gutter that may move fluid away from the gearcase and into the enclosure formed by the gearcase, and an exterior portion that includes plural fingers that may control an amount of fluid that may move out of the enclosure and control an amount of debris or foreign matter that may move into the enclosure. Additionally, the outboard seal body may include an interior portion that includes a gutter that may move fluid away from the gearcase and into the enclosure formed by the gearcase, and an exterior portion that includes plural fingers that may control an amount of fluid that may move out of the enclosure and control an amount of debris or foreign matter that may move into the enclosure The inboard and outboard seal bodies may be shaped and sized, and the corresponding gearcase may be shaped and sized to control an amount of lubricant that may be directed out of the enclosure formed by the gearcase and surrounding the gear and the pinion, to control an amount of debris or foreign matter that may be allowed into the enclosure formed by the gearcase that surround the gear and the pinion, and/or to reduce an amount of separation between the inboard and outboard seal bodies and the gearcase, respectively, during operation of the axle assembly. For example, the inboard and outboard seal bodies may be shaped and sized to reduce an amount of lubricant directed out of the enclosure relative to the gearcase assembly shown in FIGS. 1 through 8. Additionally, the inboard and outboard seal bodies may be shaped and sized to reduce an amount of debris or foreign matter allowed into the enclosure relative to the gearcase assembly shown in FIGS. 1 through 8.

While some embodiments described herein relate to axle assemblies of rail vehicle systems, not all embodiments of the inventive subject matter are restricted to rail vehicles. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. Additionally, the vehicle systems may include two or more different types of vehicles that may operate as a common vehicle system and that may communicate with each other via the off-board database.

Figure 9:
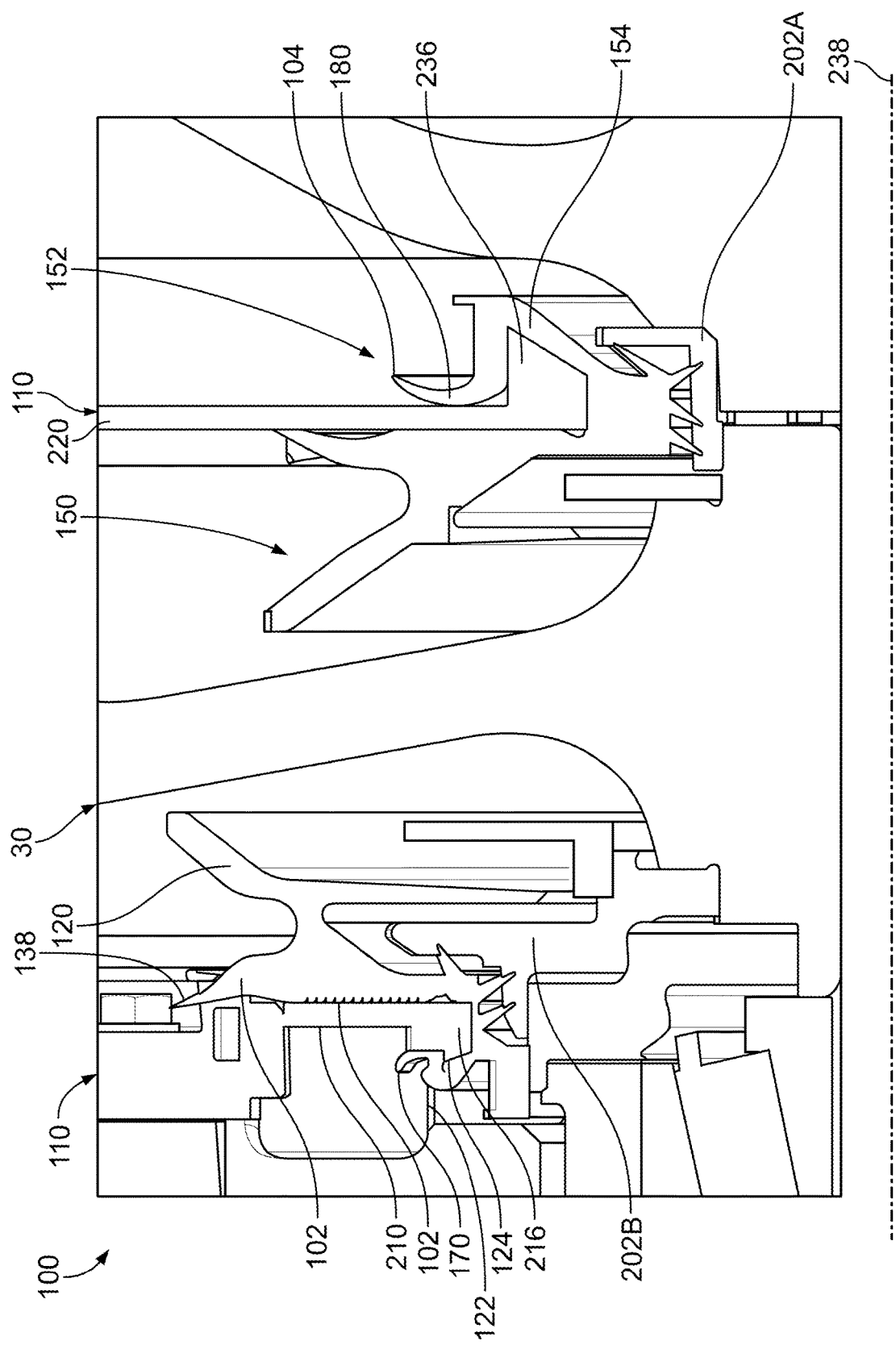
FIG. 9 illustrates a partial cross-sectional view of a gearcase seal assembly in accordance with one embodiment.

FIGS. 9 through 11 illustrate a gearcase seal assembly 100 in accordance with one or more embodiments. FIG. 9 illustrates a partial cross-sectional view of the gearcase seal assembly 100 in accordance with one embodiment. The gearcase seal assembly includes an inboard seal body 102 and an outboard seal body 104 that are disposed within an axle assembly 101. Like the axle assembly shown in FIG. 1, the axle assembly 101 includes a gear 30 that is operably coupled with an axle (not shown in FIG. 9) and operably coupled with a pinion (not shown in FIG. 9) such that movement of the pinion controlled by a motor translates into movement of the gear 30, and movement of the gear translates into movement of the axle. In one or more embodiments, one or more wheels may be operably coupled with the axle, and movement of the axle may cause the wheels to move. Optionally, the axle may be operably coupled with another mechanical device such that the gear may drive the axle to drive the other mechanical device. The gear and the pinion are enclosed by a gearcase 106 (shown in FIG. 13) that may include an upper portion 110 and a lower portion 112. Optionally, the upper portion may be referred to as a first portion, and the lower portion may be referred to as a second portion. One or more seals of the gearcase seal assembly may provide a seal or fill one or more gaps of the gearcase in order to control (e.g., reduce, inhibit, or the like) an amount of lubricant or fluid from moving out of the gearcase, and to control (e.g., reduce, inhibit, or the like) an amount of debris that may move into the enclosure formed by the gearcase.

The inboard seal body is disposed at an inside position of the gear 30 along a center axis 238 such that the inboard seal body is positioned between the gear 30 and a wheel (such as the wheel 12A shown in FIG. 1). Additionally, the outboard seal body is disposed at an outside position of the gear 30 such that the outboard seal body is positioned between the gear 30 and another wheel (such as the wheel 12B shown in FIG. 1). For example, the interior seal body is positioned at an interior position of the gear, and the outboard seal body is positions at an exterior or outer position of the gear relative to wheels disposed along and coupled with the axle of the axle assembly.

The inboard seal body 102 includes an interior portion 120 and an exterior portion 122, and the outboard seal body 104 includes an interior portion 150 and an exterior portion 152. The interior portion of the inboard seal body faces toward the outboard seal body, and the exterior portion of the inboard seal body faces away from the outboard seal body. Additionally, the inboard portion of the outboard seal body faces toward the inboard seal body, and the exterior portion of the outboard seal body faces away from the inboard seal body.

The inboard seal body and the outboard seal body extend around the center axis 238 of the axle. For example, the inboard seal body has a substantially circular shape with an opening or inboard center passage that is an open passage about the center axis and that is concentric with the center axis. Similarly, the outboard seal body has a substantially circular shape with an opening or outboard center passage that is an open passage about the center axis and that is concentric with the center axis and is concentric with the opening or passage of the inboard seal body. The axle (not shown) of the axle assembly may be disposed within the inboard center passage of the inboard seal body and the outboard center passage of the outboard seal body.

The inboard seal body may extend in a first radial plane relative to the center axis, such that the inboard seal body is positioned substantially perpendicular to the center axis. Additionally, the outboard seal body may extend in a different, second radial plane relative to the center axis, such that the outboard seal body is position substantially perpendicular to the center axis. A distance between the inboard and outboard seal bodies may be driven by one or more of the size of the gear, the size of the gearcase, or the like.

The inboard seal body 102 is coupled with a first side or first surface 210 of the gearcase, and in particular an upper portion 110 of a gearcase. Additionally, the outboard seal body 104 is coupled with a second side or a second surface 220 of the gearcase. The inboard seal body may be disposed between a base end 216 of the first side of the gearcase and an inboard mating structure 202B to provide a barrier between the first surface and the inboard mating structure. Similarly, the outboard seal body may be disposed between a base end 236 of the second side of the gearcase and an outboard mating structure 202A. For example, the inboard and outboard seal bodies substantially fill a gap between the inboard and outboard mating structures and the based ends of the first and second sides of the gearcase, respectively.

Figure 2:
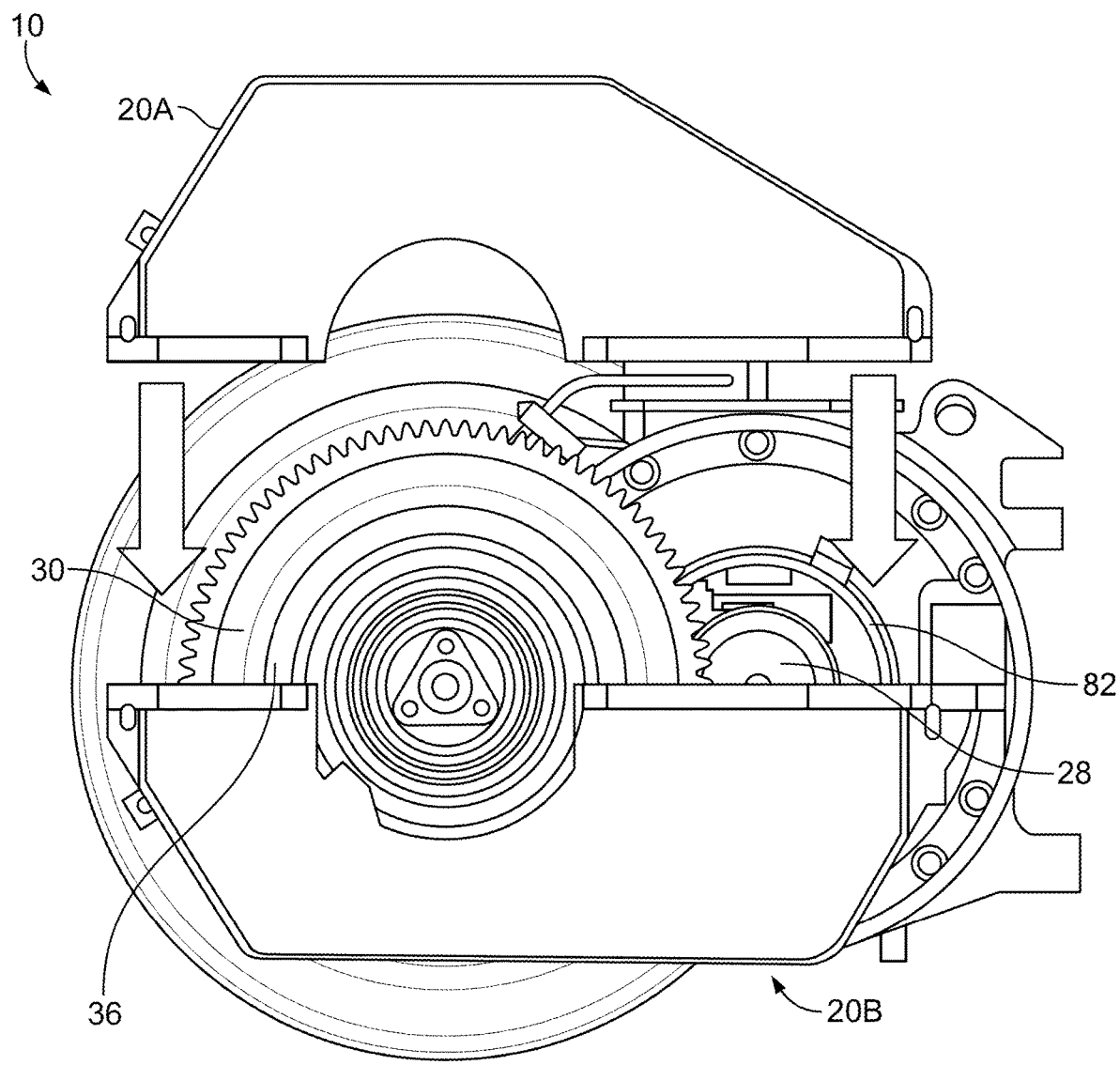
FIG. 2 illustrates a side view of the axle assembly shown in FIG. 1.
Figure 3:
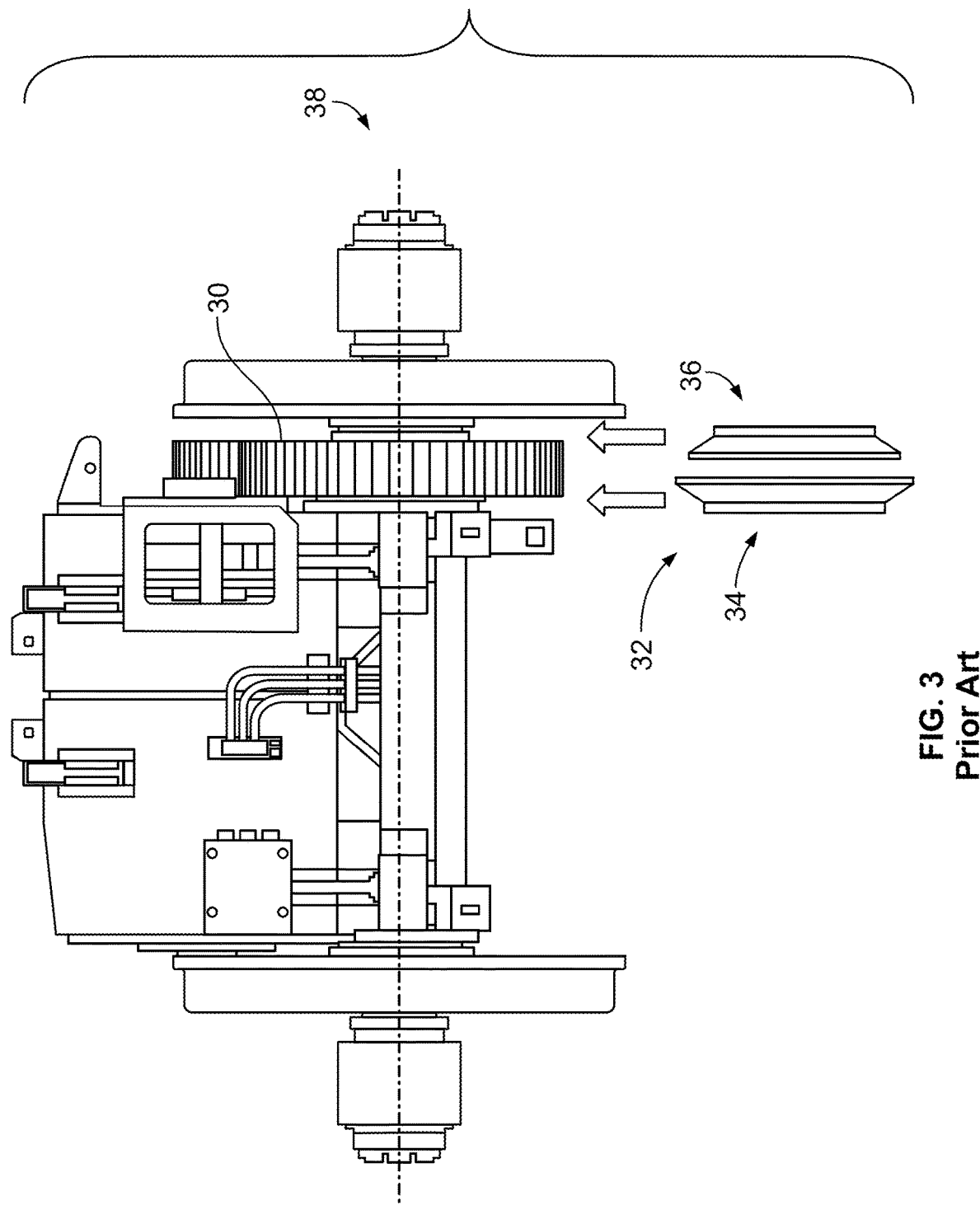
FIG. 3 illustrates a partially exploded front view of the axle assembly shown in FIG. 1.
Figure 4:
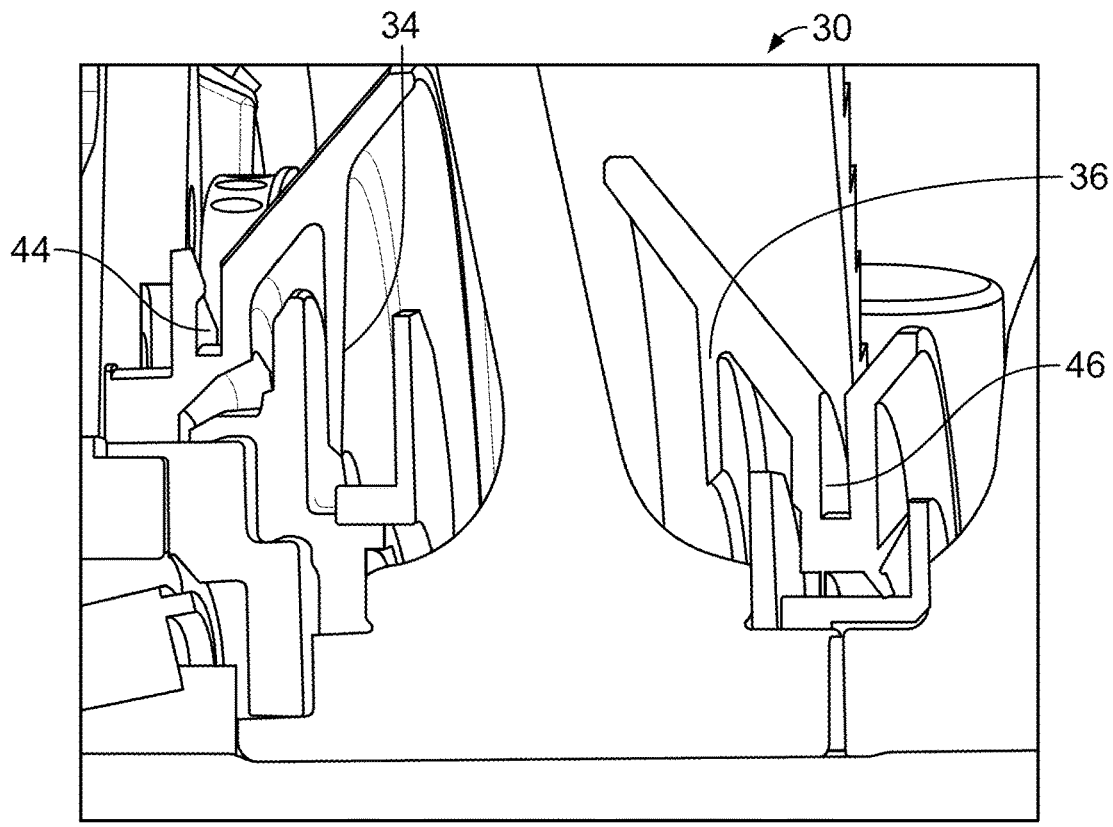
FIG. 4 illustrates examples of gearcase inboard and outboard gutter seals.
Figure 5:
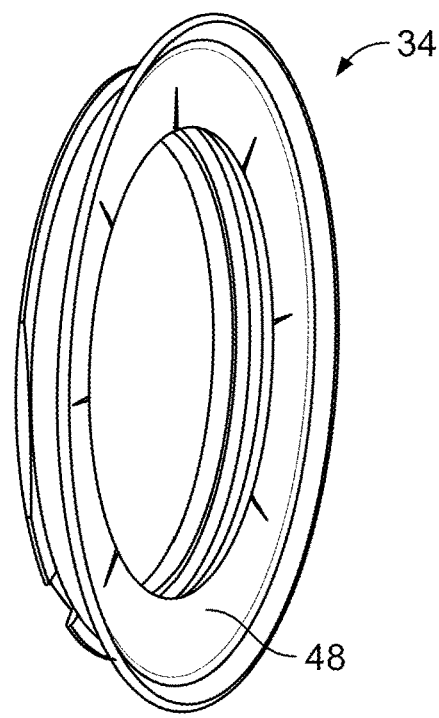
FIG. 5 illustrates a perspective view of the inboard gutter seal shown in FIG. 4.
Figure 6:
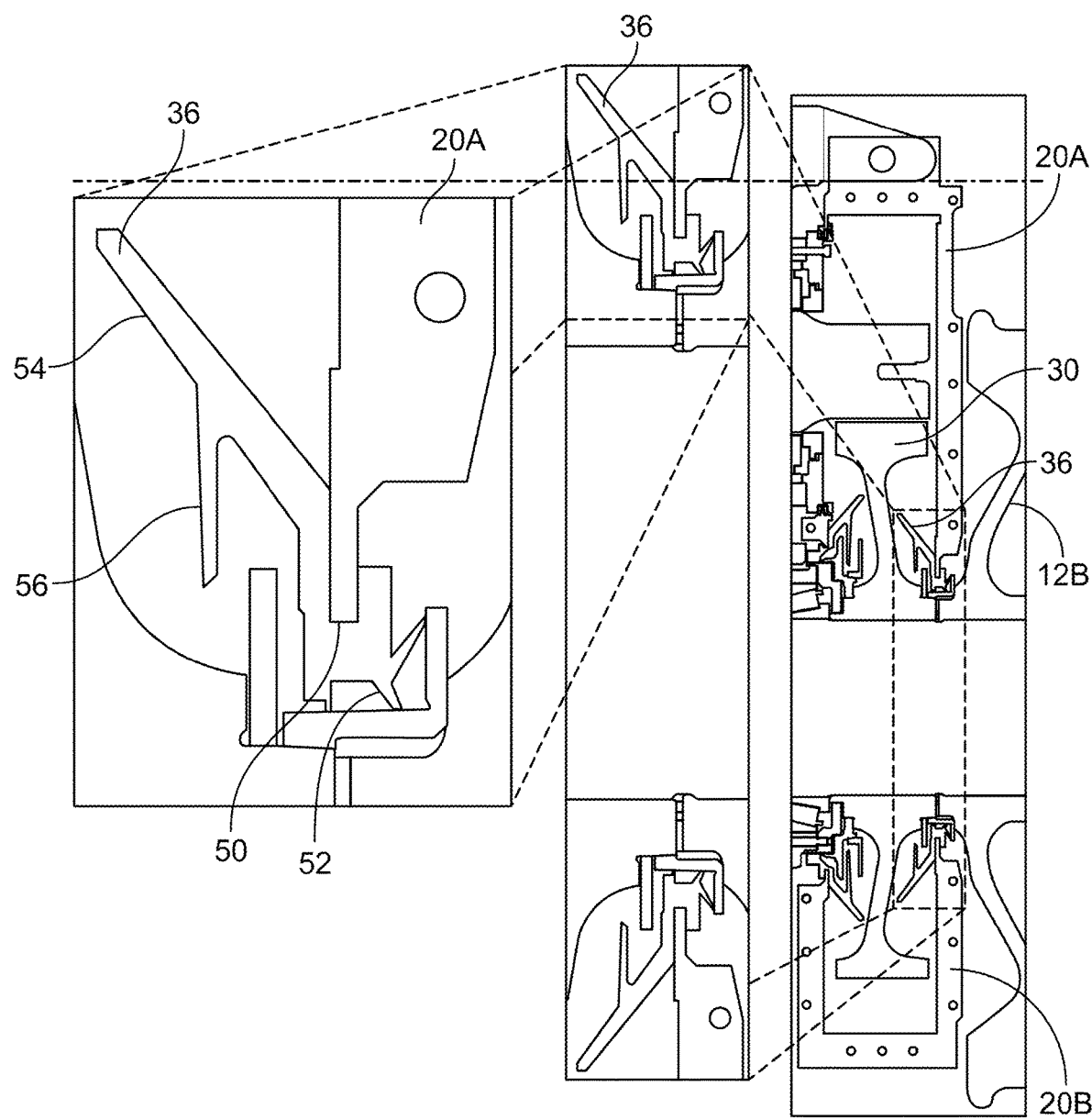
FIG. 6 illustrates different levels of magnification of a cross-sectional view of the outboard gutter seal of the axle assembly shown in FIG. 1.
Figure 7:
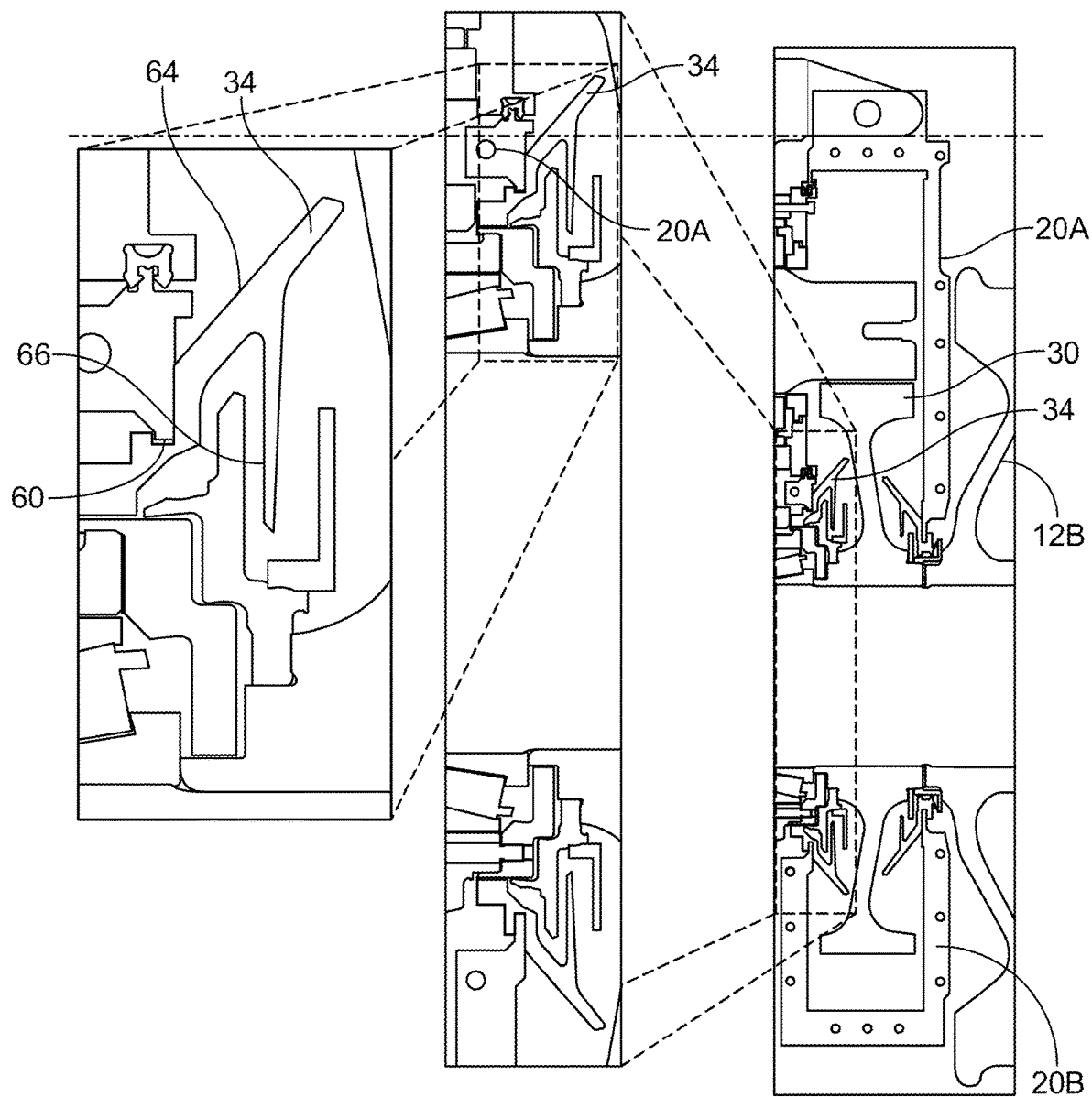
FIG. 7 illustrates different levels of magnification of a cross-sectional view of the inboard gutter seal of the axle assembly shown in FIG. 1.

The gearcase, like the gearcase shown in FIGS. 1 and 2, may be used to provide an enclosure, or compartment, in which the gear 30 and pinion may be disposed. The enclosure or compartment may be formed by the gearcase extending around and containing the gear and pinion. For example, the gearcase may be used to substantially contain a fluid, such as a lubricant, within the enclosure formed by the gearcase that may be used to improve an efficiency of the rotational motion of the gear and/or pinion. Additionally, the gearcase may be used to control or reduce an amount of debris or other foreign matter from coming into contact with the gear and/or pinion relative to the seals shown in FIGS. 1 through 8.

The gearcase seal assembly of the inboard seal body and the outboard seal body is positioned within the axle assembly such that the inboard and outboard seal bodies provide a seal between the gearcase and the gear. The inboard and outboard seal bodies may increase an amount of the fluid that remains within the enclosure formed by the gearcase relative to the known gutter seals shown in FIGS. 1 through 8 of the known axle assembly. For example, the inboard and outboard seal bodies reduce an amount of fluid that may move out of the enclosure formed by the gearcase relative to the gutter seals shown in FIGS. 1 through 8. Additionally or alternatively, the inboard and outboard seal bodies may decrease an amount of debris or foreign matter that may move into the enclosure formed by the gearcase relative to the known gutter seals shown in FIGS. 1 through 8.

FIG. 10 illustrates a partial cross-sectional view of the outboard seal body 104 of the gearcase seal assembly. As illustrated in FIGS. 9 and 10, the outboard seal body includes the interior portion 150 and the exterior portion 152. At least part of the interior portion of the outboard seal body is positioned within or inside the enclosure formed by the gearcase. At least part of the exterior portion of the outboard seal body is positioned outside of the enclosure formed by the gearcase.

The interior portion 150 includes a gutter 156 that is formed by an interior gutter finger 142 and an exterior gutter finger 144. For example, at least some of the fluid may pool or collect within the gutter. The interior gutter finger 142 is in contact with an interior surface 234 of the second surface 220 of the upper portion of the gearcase. The interior gutter finger is shaped to direct fluid in a direction away from the interior surface of the gearcase and toward the gutter. Additionally or alternatively, the interior gutter finger may be shaped to improve an efficiency of assembling the outboard seal body with a base end 236 of the second surface of the gearcase.

In one or more embodiments, the outboard seal body may include one or more conduits 162 that may be disposed along a surface 160 of the outboard seal body that is operably coupled with the interior surface 234 of the gearcase. The one or more conduits may be passages, gutters, or the like, that may direct fluid in one or more directions about the center axis (e.g., into and out of the page of the illustration shown in FIG. 10). For example, the one or more conduits may direct the fluid in a clockwise direction and/or a counterclockwise direction around the center axis. In one or more embodiments, the one or more conduits may extend around the outboard seal body toward a drain or exhaust passage (not shown) that may be disposed at or proximate to a bottom-dead-center, or the like, of the outboard seal body. For example, gravity may promote the movement of fluid within the one or more conduits in the clockwise and/or counterclockwise directions about the center axis.

The interior portion also includes an extension 146 that extends in a different direction relative to the interior and exterior gutter fingers. For example, the extension may extend a distance away from the exterior gutter finger such that the extension may reduce an amount of fluid that may move toward the exterior portion of the outboard seal body.

In one or more embodiments, the outboard seal body may have an interior portion that has one or more alternative or additional fingers, extensions, gutters, or the like, to control the direction of movement of the fluid within the enclosure formed by the gearcase. For example, the interior portion of the outboard seal body may have any alternative shape, size, orientation, or the like.

The exterior portion 152 of the outboard seal body includes an outboard pocket 154 that is shaped and sized to receive the base end 236 of the gearcase. The outboard pocket is formed by a snap-in feature 148 of the outboard seal body. In the illustrated embodiment, the snap-in feature has a shape and size that corresponds to a shape and size of the base end of the gearcase. For example, as the outboard seal body is being assembled with the gearcase, the base end of the gearcase may cause a space between the interior portion and the exterior portion of the outboard seal body to expand or move apart. Responsive to the base end reaching the outboard pocket, the base end may snap or fall into the outboard pocket and the space between the interior and exterior portions may substantially return to the non-assembling state. Additionally, the snap-in feature is shaped to maintain a position of the base end within the outboard pocket. For example, in the illustrated embodiment, the snap-in feature includes one or more surfaces that substantially prohibit the base end of the gearcase from moving in a direction away from the outboard pocket (e.g., toward an unassembled position). Optionally, the snap-in feature may have any alternative shape and/or size.

The exterior portion includes a lead-in feature 180 that is shaped to improve an efficiency of assembling the outboard seal body with the base end of the gearcase. The lead-in feature 180 increases a size of an opening of the outboard pocket 154. For example, the lead-in feature is shaped to promote or encourage the base end of the gearcase to move in a direction toward the outboard pocket. The illustrated embodiments of FIGS. 9 and 10 illustrate the lead-in feature as a finger-like structure. Optionally, the lead-in feature may have any alternative shape, size, or other geometric properties that may improve in assembling the outboard seal body with the gearcase.

The outboard seal body 104 may include plural fingers 158 that are disposed outside of the outboard pocket and extend in one or more directions away from the outboard pocket and toward the outboard mating surface 202A. In the illustrated embodiment of FIG. 10, the outboard seal body includes four fingers, with a first finger 158A extending in a first orthogonal direction and a second finger 158B that extends in a different, second orthogonal direction away from the outboard pocket. The plural fingers may also be referred to as extensions, leads, appendages, or the like, of the outboard seal body. The plural fingers may be shaped, sized, positioned, and/or oriented to reduce an amount of debris that may move into the enclosure formed by the gearcase. Additionally or alternatively, at least one of the fingers may be shaped, sized, positioned, and/or oriented to reduce an amount of fluid that may move out of the enclosure formed by the gearcase.

Figure 12:
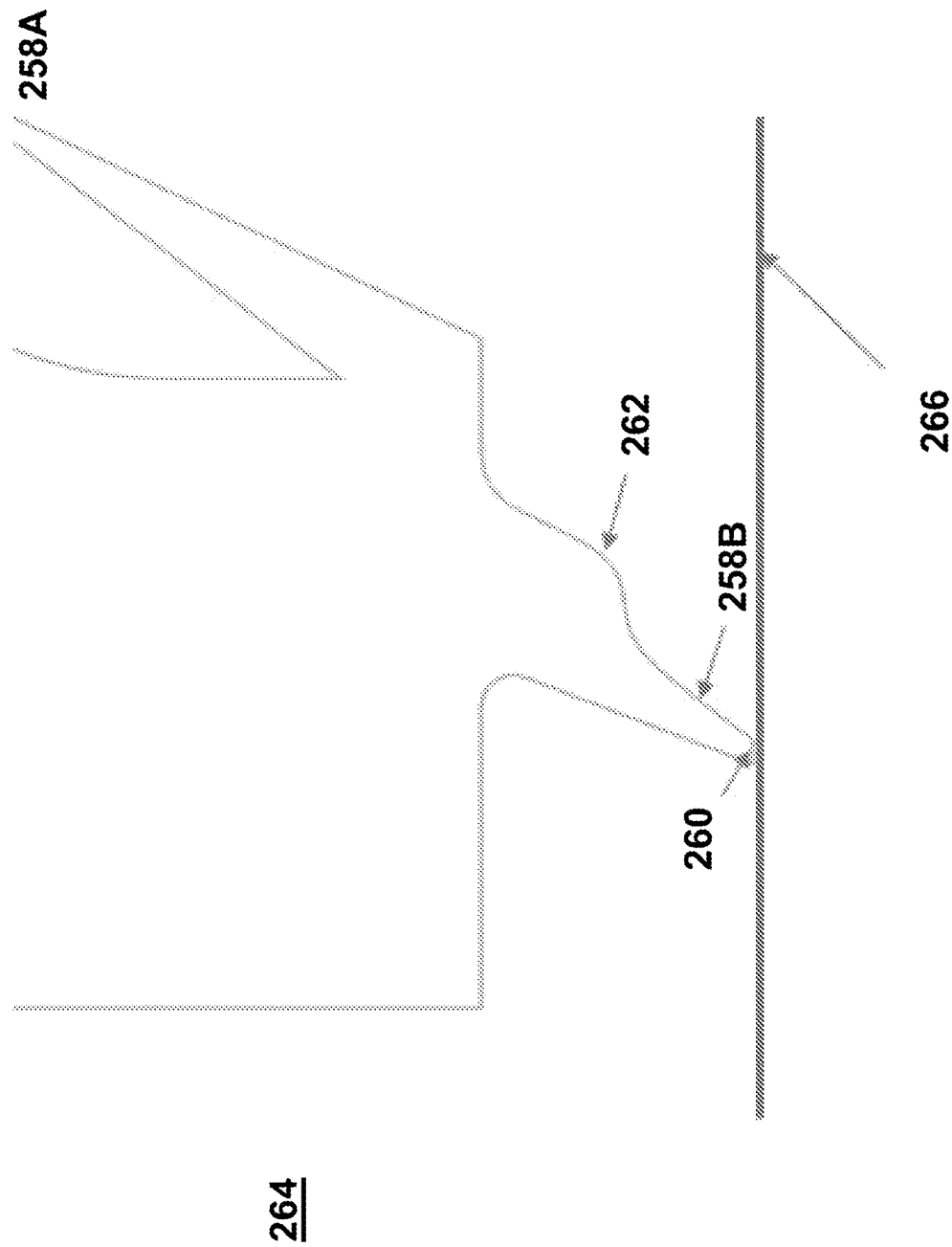
FIG. 12 illustrates a partial cross-sectional view of a seal body of a gearcase seal assembly in accordance with one embodiment.

In one or more embodiments, one or more of the plural fingers may be shaped based on an estimated amount of abrasion the fingers are expected to be subjected to during operation of the vehicle system. For example, FIG. 12 illustrates one example of one of the plural fingers 258 of an outboard seal body, such as the outboard seal body shown in FIG. 10. The seal body includes a first finger 258A (e.g., that corresponds with the finger 158A shown in FIG. 10) that is positioned away from an interior portion 264 of the gearcase. For example, the fluid may be contained within the interior portion 264 of the enclosure formed by the gearcase. The seal body also includes a second finger 258B that includes a tip portion 260 that is configured to be in contact with a rotating component 266 that extends along the center axis 238 (shown in FIG. 9). The second finger includes a heel portion 262 that is disposed a distance away from a surface of the rotating component.

In the illustrated embodiment of FIG. 12, the tip portion of the second finger deflects upon contact with the rotating component radially outward and axially toward the interior portion. The narrow tip portion of the second finger provides sealing with the rotating component under concentric conditions. Additionally, the heel portion, which is thicker or larger than the tip portion, provides resistance against excessive abrasion to the finger under eccentric conditions. For example, the cross-sectional geometry of the second finger with the smaller tip portion relative to the larger heel portion controls an amount of pressure on a sole portion of the finger between the tip portion and the heal portion. Controlling the amount of pressure on the sole portion of the finger with the cross-sectional geometry of the seal finger reduces an amount of deflection caused to the tip portion under a condition of excess interference. In one or more embodiments, controlling or reducing an amount of deflection to the tip portion of the finger improves to maintain contact between the tip portion and the rotating component.

Returning to FIGS. 9 and 10, in the illustrated embodiments of FIGS. 9 and 10, the outboard seal body is formed as a unitary structure. For example, the interior and exterior gutter fingers, the extension, the plural fingers, and the snap-in feature may be formed as a unitary structure or embodiment. In one or more embodiments, the outboard seal body may be molded, extruded, 3D printed, or the like, as a single entity or structure. Optionally, one or more of the features of the outboard seal body may be formed as a separate entity and may be operably coupled with the outboard seal body via one or more known coupling methods, such as, but not limited to, adhesion, welding, fasteners, or the like.

FIG. 11 illustrates a partial cross-sectional view of the inboard seal body 102 of the gearcase seal assembly. As illustrated in FIGS. 9 and 11, the inboard seal body includes the interior portion 120 and the exterior portion 122. At least a portion of the interior portion of the inboard seal body is positioned within or inside the enclosure formed by the gearcase. Additionally, at least a portion of the exterior portion of the inboard seal body is positioned outside of the enclosure formed by the gearcase.

The interior portion 120 includes a gutter 126 that is formed by an interior gutter finger 132 and an exterior gutter finger 134. At least some of the fluid within the enclosure formed by the gearcase may pool or collect within the gutter. The interior gutter finger is in contact with or is operably coupled with an interior surface 214 of the first surface 210 of the upper portion of the gearcase. The interior gutter finger is shaped to direct fluid in a direction away from the interior surface of the gearcase and toward the gutter. Additionally or alternatively, the interior gutter finger may be shaped to improve an efficiency of assembling the inboard seal body with the base end 216 of the first surface of the gearcase.

In one or more embodiments, the inboard seal body may include one or more conduits 162 that may be disposed along a surface 161 of the inboard seal body that is operably coupled with the interior surface 214 of the gearcase. The one or more conduits may be passages, gutters, or the like, that may direct fluid in one or more directions about the center axis (e.g., into and out of the page of the illustration shown in FIG. 10). For example, the one or more conduits may direct the fluid in a clockwise direction and/or a counterclockwise direction around the center axis. In one or more embodiments, the one or more conduits may extend around the inboard seal body toward a drain or exhaust passage (not shown) that may be disposed proximate to a bottom-dead-center, or the like, of the inboard seal body. For example, gravity may promote the movement of fluid within the one or more conduits in the clockwise and/or counterclockwise directions about the center axis.

In one or more embodiments, the interior portion of the inboard seal body may include an extension 136 that extends in a different direction relative to the interior and exterior gutter fingers. For example, the extension may extend in a direction away from the exterior gutter finger such that the extension may reduce an amount of fluid that may move toward the exterior portion of the inboard seal body. In one or more embodiments, the inboard seal body may have an interior portion that has or includes one or more alternative or additional fingers, extensions, gutters, or the like, that may be used to control the direction of movement of the fluid within the enclosure formed by the gearcase. For example, the interior portion of the inboard seal body may have any alternative shape, size, orientation, or the like.

The exterior portion 122 of the inboard seal body may include an inboard pocket 124 that is shaped and sized to receive the base end 216 of the gearcase. The inboard pocket may be formed by a snap-in feature 138. In the illustrated embodiment, the snap-in feature has a shape and size that corresponds to a shape and size of the base end of the gearcase. For example, as the inboard seal body is being assembled with the gearcase, the base end of the gearcase may cause a space between the interior portion and the exterior portion of the inboard seal body to expand or move apart. Responsive to the base end reaching the inboard pocket, the base end may snap or fall into the inboard pocket and the space between the interior and exterior portions may substantially return to the non-assembling state or the state of the inboard seal body prior to assembling the base end with the inboard seal body. Additionally, the snap-in feature may be shaped to maintain a position of the base end within the inboard pocket. For example, the illustrated embodiment, the snap-in feature includes one or more surfaces that substantially prohibit the base end of the gearcase from moving in a direction away from the inboard pocket (e.g., toward an unassembled position). Optionally, the snap-in feature may have any alternative shape and/or size.

In one or more embodiments, the exterior portion may include a lead-in feature 170 that is shaped to improve an efficiency of assembling the inboard seal body with the base end of the gearcase. For example, the lead-in feature increases a size of an opening of the inboard pocket 124. The lead-in feature may be shaped to promote or encourage the base end of the gearcase to move in a direction toward the inboard pocket. The illustrated embodiments of FIGS. 9 and 11 illustrate the lead-in feature of the inboard seal body as a finger-like structure. Optionally, the lead-in feature may have any alternative shape, size, or other geometric properties that may improve in assembling the inboard seal body with the gearcase.

The inboard seal body 102 may include plural fingers 128 that may be disposed outside of the inboard pocket and extend in one or more directions away from the inboard pocket and toward the inboard mating surface 202B. In the illustrated embodiment of FIG. 11, the inboard seal body includes three fingers, with a first finger 128A extending in a first orthogonal direction and a second finger 128B extending in a different, second orthogonal direction away from the inboard pocket. The plural fingers may also be referred to herein as extensions, leads, appendages, or the like, of the inboard seal body. The plural fingers may be shaped, sized, positioned, and/or oriented to reduce an amount of debris that may move into the enclosure formed by the gearcase. Additionally or alternatively, at least one of the fingers may be shaped, sized, positioned, and/or oriented to reduce an amount of fluid that may move out of the enclosure formed by the gearcase.

In the illustrated embodiments of FIGS. 9 and 11, the inboard seal body is formed as a unitary structure or entity, for example, the interior and exterior gutter fingers, the extension, the plural fingers, and the snap-in feature may be formed as a unitary structure or embodiment. In one or more embodiments, the inboard seal body may be molded, extruded, 3D printed, or the like, as a single entity or structure. Optionally, one or more of the features of the inboard seal body may be formed as a separate entity and may be operably coupled with the inboard seal body via one or more known coupling methods such as, but not limited to, adhesion, welding, fasteners, or the like.

In one or more embodiments, the inboard and/or outboard seal bodies may be manufactured additively as a single, unitary component. For example, the inboard seal body may be additively formed as a unitary body and/or the outboard seal body may be additively formed as a unitary body. Additively manufacturing the inboard and/or outboard seal bodies allows for the inboard and/or outboard seal bodies to be more compact relative to manufacturing one or both of the inboard or outboard seal bodies using non-additively manufacturing methods, such as extruding, stamping, casting, forging, or the like. Additionally, additively manufacturing the inboard and/or outboard seal bodies allows the seal bodies to have varying three-dimensional shapes, to have multi-domain cooling techniques (e.g., different fluid draining and/or cooling channels, or the like), to be manufactured with two or more different materials (e.g., a first material disposed at a first portion of the inboard seal body, and a second material disposed at a second portion of the inboard seal body that has a different hardness, different thermal properties, or the like, relative to the first material), or the like, within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the inboard and/or onboard seal bodies, or other portions of the system, can be formed in another manner.

Figure 8:
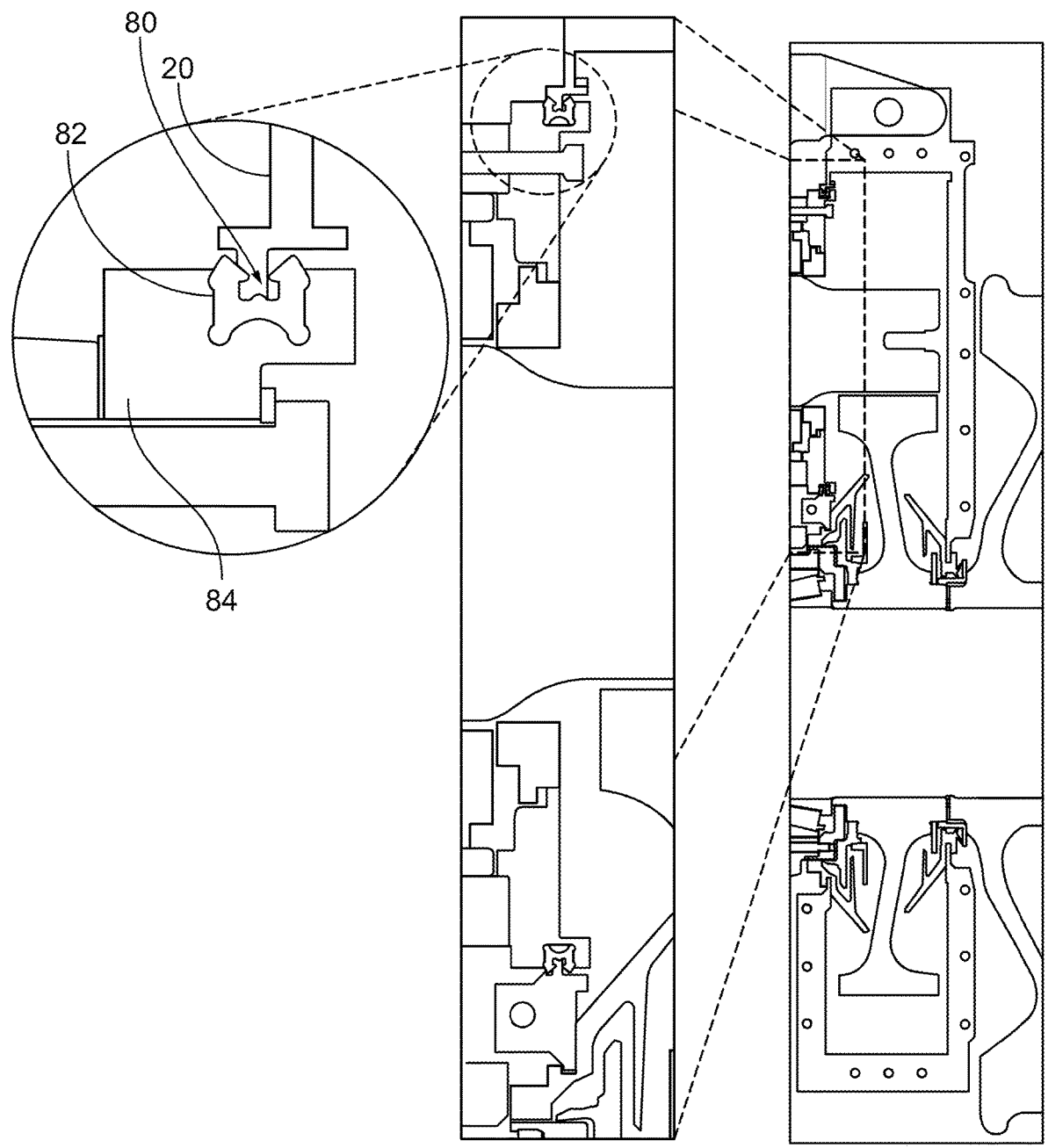
FIG. 8 illustrates different levels of magnification of a cross-sectional view of a pinion seal of the axle assembly shown in FIG. 1.

Returning to the axle assembly shown in FIGS. 1 through 8, the gearcase seal 32 also includes the pinion seal 82. FIG. 8 illustrates different levels of magnification of the pinion seal disposed at an interface 80 between the gearcase 20 and a pinion bearing endcap 84. Like the inboard and outboard gutter seals, the pinion seal is a C-shaped gasket, such that the seal includes a center section and two opposite side extension sections on either side of the center section. The pinion seal is shaped and sized to be positioned within a pocket of the pinion bearing endcap and to receive the gearcase.

Figure 13:
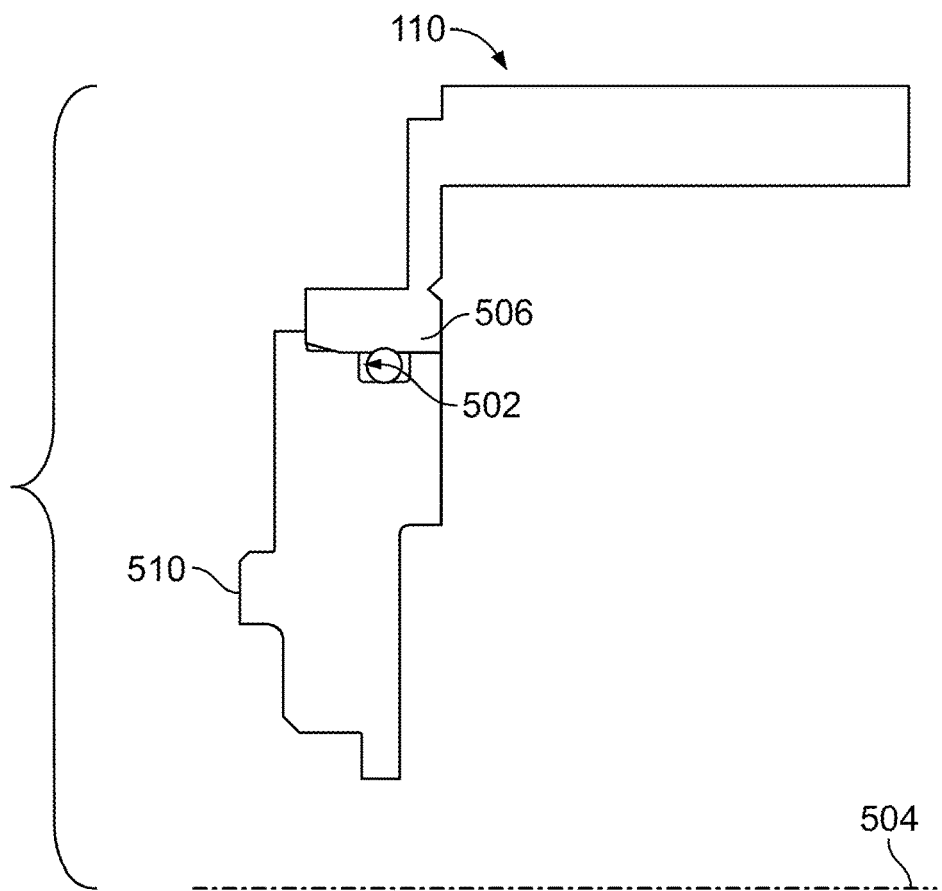
FIG. 13 illustrates a partial cross-sectional view of a pinion seal of a gearcase seal assembly in accordance with one embodiment.

Alternatively, in one or more embodiments, the gearcase seal assembly may include a pinion seal. For example, FIG. 13 illustrates a partial cross-sectional view of a pinion seal 502 that is disposed between a surface 506 of the upper portion 110 of the gearcase and a pinion bearing end-cap 510. A pinion of the axle assembly (such as the pinion shown in FIGS. 1-2) extends along a pinion axis 504. The pinion seal 502 extends about the pinion axis. For example, the pinion seal may have a substantially circular shape that extends about the pinion axis.

Figure 14:
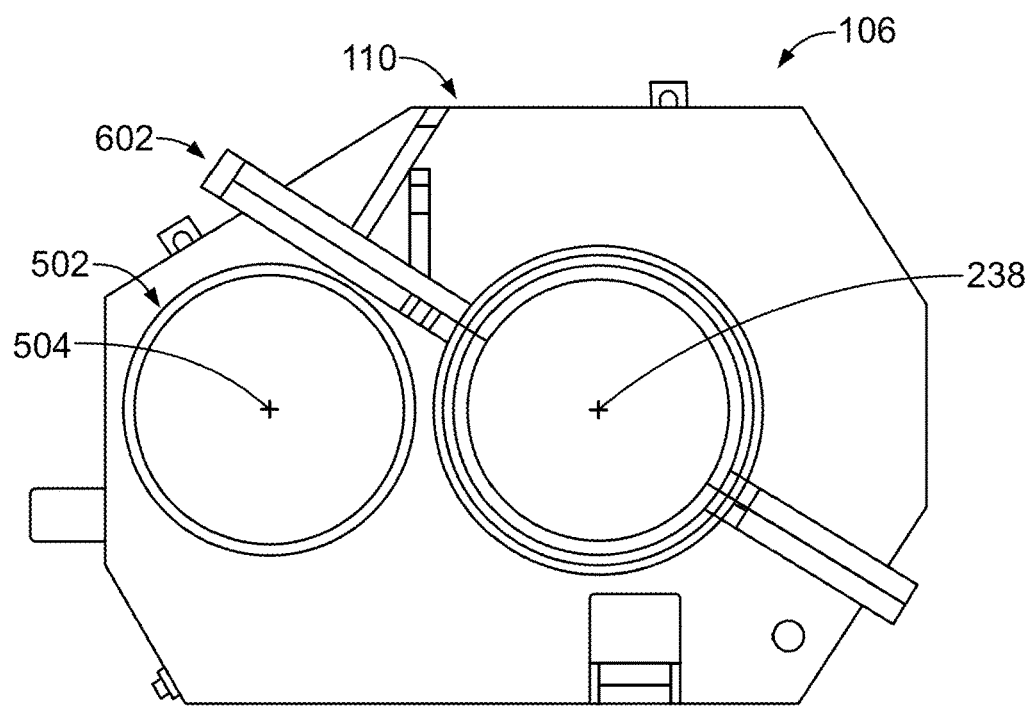
FIG. 14 illustrates a side view of a gearcase in accordance with one embodiment.

FIG. 14 illustrates a side view of the gearcase 106. The gear (not shown) extends around the center axis 238 of the axle, and the pinion (not shown) extends around the pinion axis 504. The center axis and the pinion axis are substantially aligned with each other along a substantially horizontal plane. The upper portion 110 of the gearcase and the lower portion 112 of the gearcase come together and are coupled with each other along a split-line intersection 602. Unlike the substantially horizontal split-line intersection of a known axle assembly (shown in FIG. 2), the split-line intersection of the gearcase extends in a non-horizontal direction. For example, the slit-line intersection intersects with the center axis 238, but the split-line intersection does not intersect with the pinion axis 504.

Figure 15:
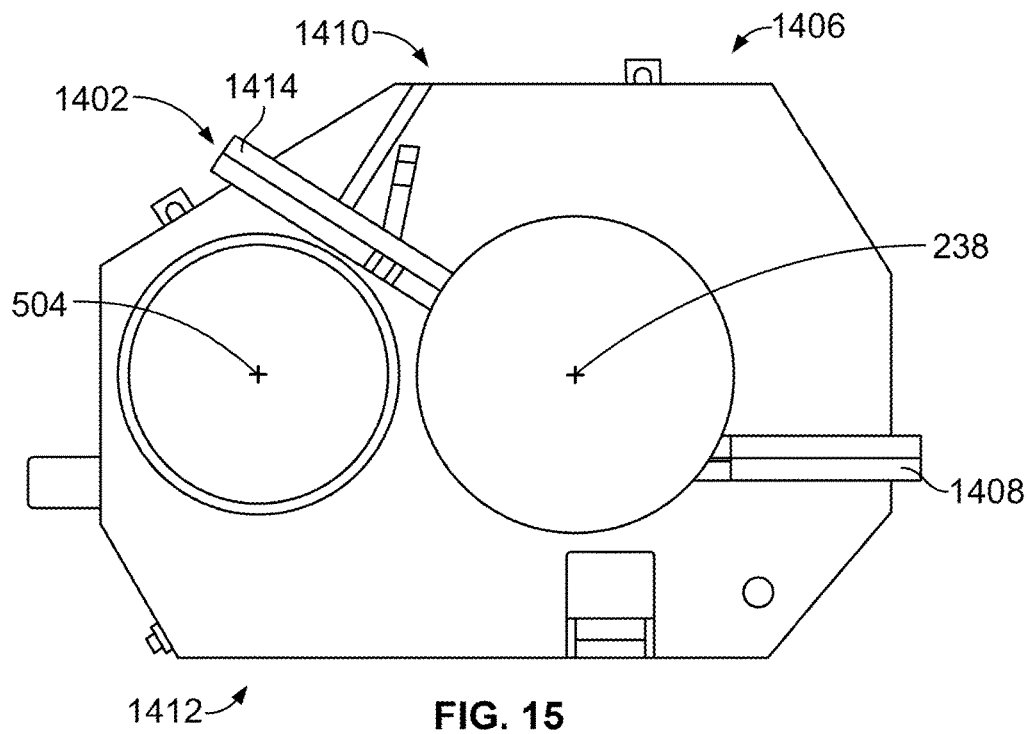
FIG. 15 illustrates another example of a gearcase of an axle assembly in accordance with one embodiment.

FIG. 15 illustrates an alternative embodiment of a gearcase 1406. The gearcase 1406 has an upper portion 1410 and a lower portion 1412 that are coupled together along a split-line intersection 1402. Unlike the split-line intersection shown in FIG. 13, the split-line intersection does not extend in a linear direction. Alternatively, a first portion 1408 of the split-line intersection extends in a substantially horizontal direction, and a second portion 1414 of the split-line intersection extends in a non-horizontal direction. Optionally, the split-line intersection between the upper and lower portions of the gearcase may extend in any alternative direction, have two or more different portions that may extend in different directions, or any combination therein.

Figure 16:
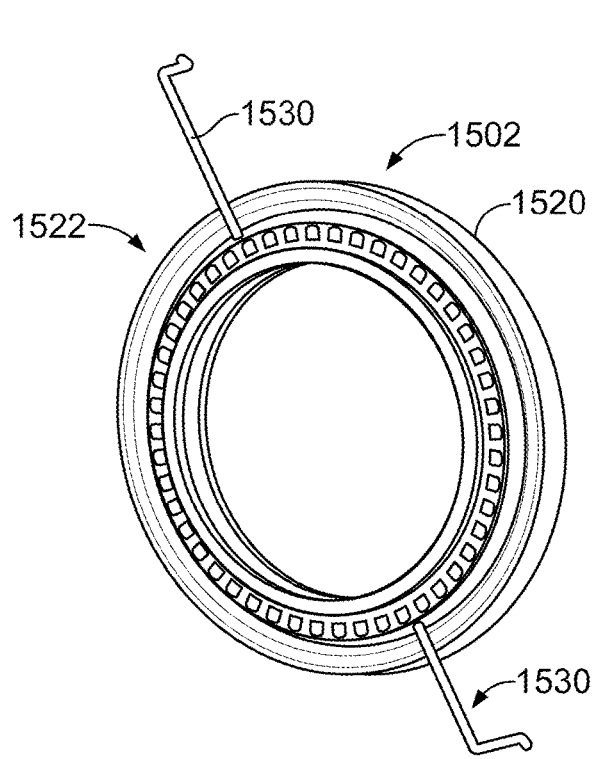
FIG. 16 illustrates a perspective view of one example of an inboard seal body in accordance with one embodiment.
Figure 17:
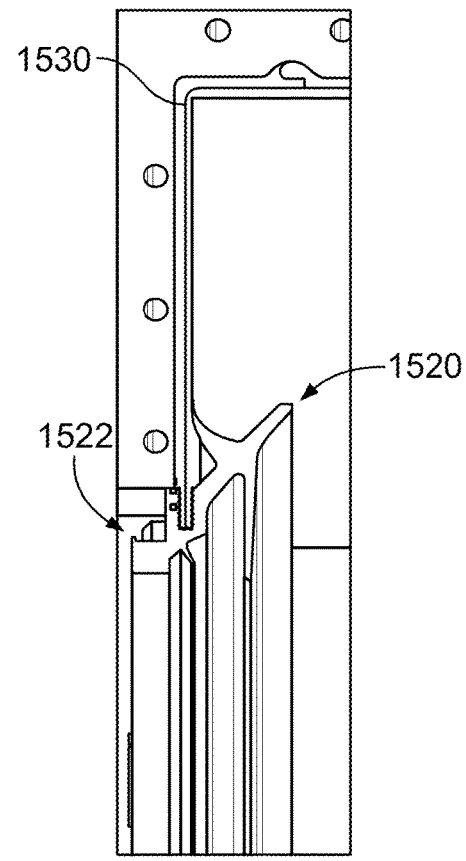
FIG. 17 illustrates a partial side view of the inboard seal body shown in FIG. 16.

FIG. 16 illustrates a perspective view of one example of an inboard seal body 1502 in accordance with one embodiment. FIG. 17 illustrates a partial side view of the inboard seal body shown in FIG. 16. Like the inboard seal body shown in FIGS. 9 and 11, the inboard seal body includes an interior portion 1520 and an exterior portion 1522. The inboard seal body also includes an extension 1530 that extends a distance away from the exterior portion of the inboard seal body. In the illustrated embodiment of FIG. 16, the inboard seal body includes two extensions that are disposed on substantially opposite sides of the circular inboard seal body, and extend along a common plane. Alternatively, the inboard and/or outboard seal bodies may include any number of extensions that may be disposed at one or more locations around a perimeter of the seal bodies and extend in one or more orthogonal directions away from a center axis formed by the seal body. The extension 1530 is shaped and sized to be fill an interface of the gearcase. For example, the extension may extend a distance away from the inboard seal body to provide a larger seal at the interface between the seal and the gearcase to reduce an amount of fluid that moves out of the enclosure formed by the gearcase, and to reduce an amount of debris that may move into the enclosure of the gearcase. Optionally, the different extensions may have any common or unique shapes, sizes, orientations, or the like, relative to each other.

Figure 18:
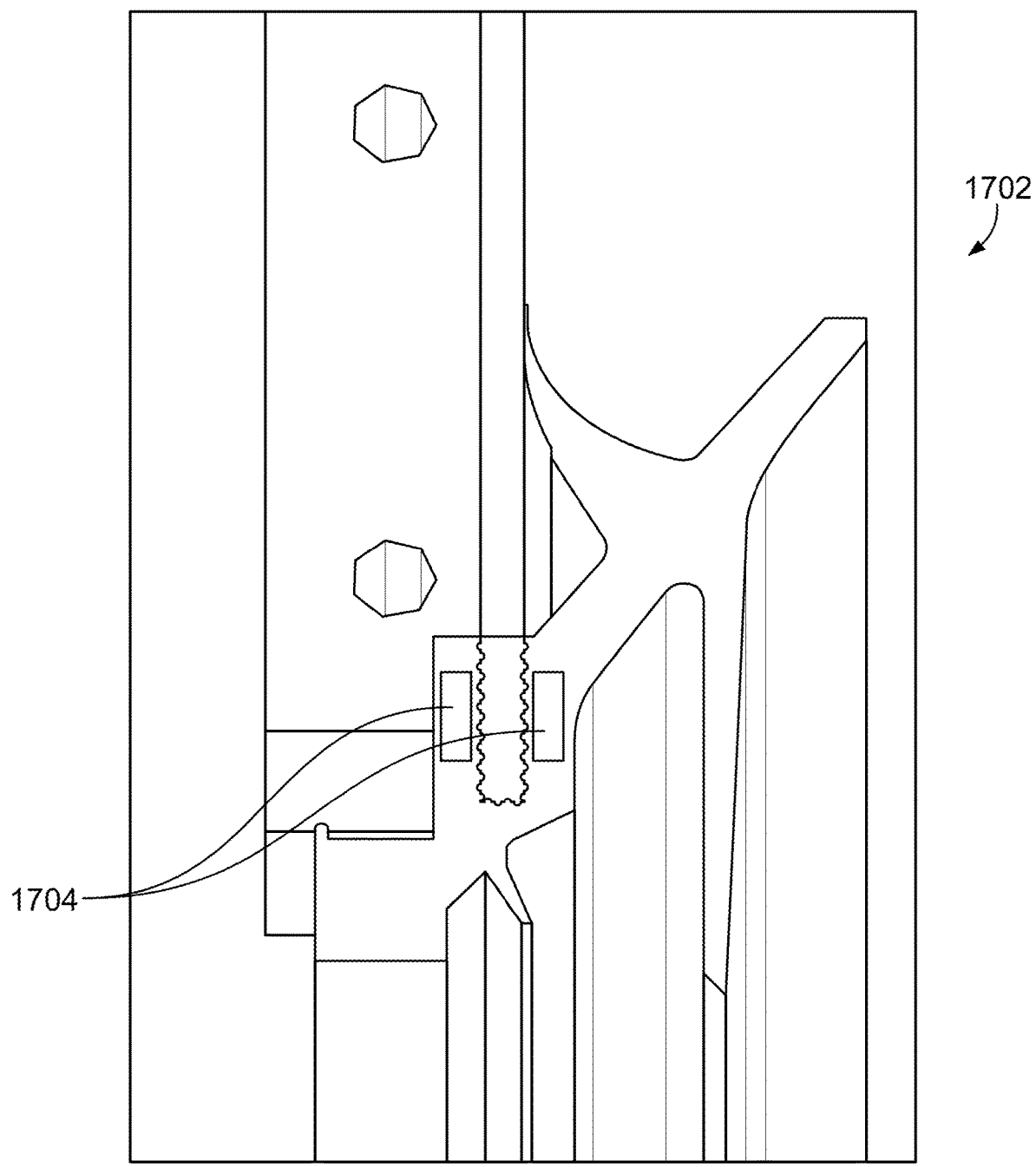
FIG. 18 illustrates a partial side view of an inboard seal body in accordance with one embodiment.

FIG. 18 illustrates a partial side view of an inboard seal body 1702 in accordance with one embodiment. Like the inboard seal bodies shown in previous embodiments, the inboard seal body includes an interior portion and an exterior portion, and receives a portion of the gearcase within an inboard pocket. The inboard seal body includes magnets 1704. In the illustrated embodiment of FIG. 18, the inboard seal body includes two magnets in which a first magnet is integrated with or embedded within a portion of the exterior portion of the inboard seal body, and a second magnet is integrated with or embedded within a portion of the interior portion of the inboard seal body. The two magnets are substantially aligned with each other such that the two magnets are configured to be drawn toward each other and toward the gearcase. For example, the magnets are disposed within the inboard seal body along surfaces of the inboard seal body forming the inboard pocket that is configured to receive the gearcase. The magnets may work together to provide positive sealing pressure to the surfaces of the gearcase. For example, the magnets may be used to improve a retention force of the gearcase within the inboard pocket.

Figure 19:
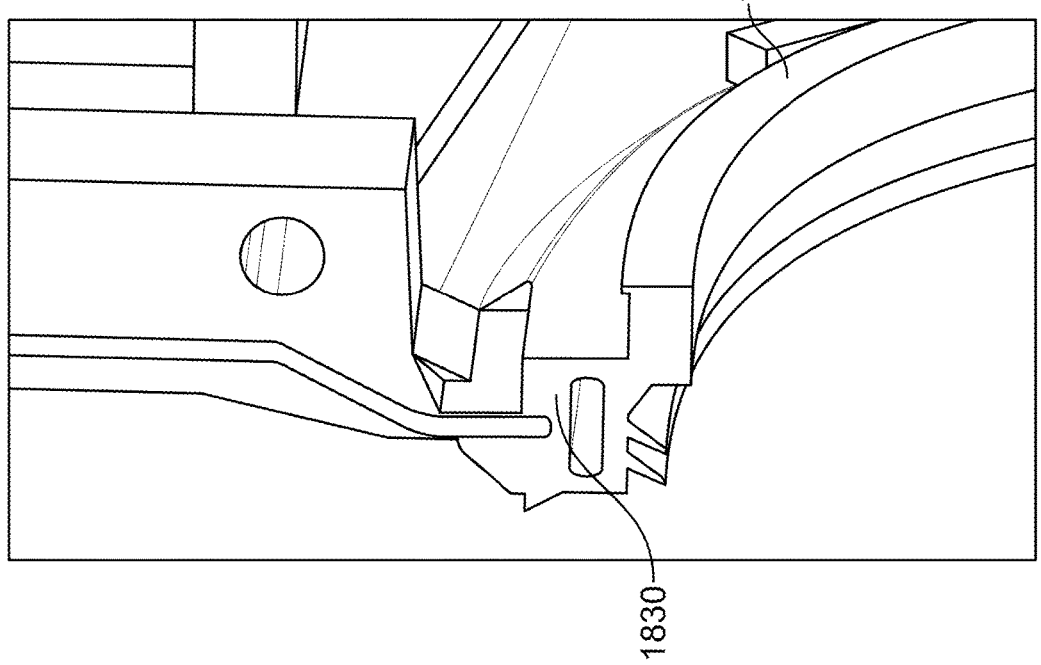
FIG. 19 illustrates a perspective cross-sectional view of a drainage system of a gearcase seal assembly in accordance with one embodiment.

FIG. 19 illustrates a perspective cross-sectional view of a drainage system 1830 of an outboard seal body 1804 in accordance with one embodiment. The drainage system includes a conduit or passage that may be an open passage within a portion of the outboard seal body and extend around a center axis of the outboard seal body when the outboard seal body is coupled with a gearcase. For example, the drainage system may provide a flow path from fluid to move within the outboard seal body. In one or more embodiments, the drainage system may include one or more fluid passages or conduits that may direct fluid towards a location along a perimeter of the outboard and/or inboard seal bodies, such as toward a bottom-dead-center of the outboard seal body relative to a line of longitude.

Figure 20:
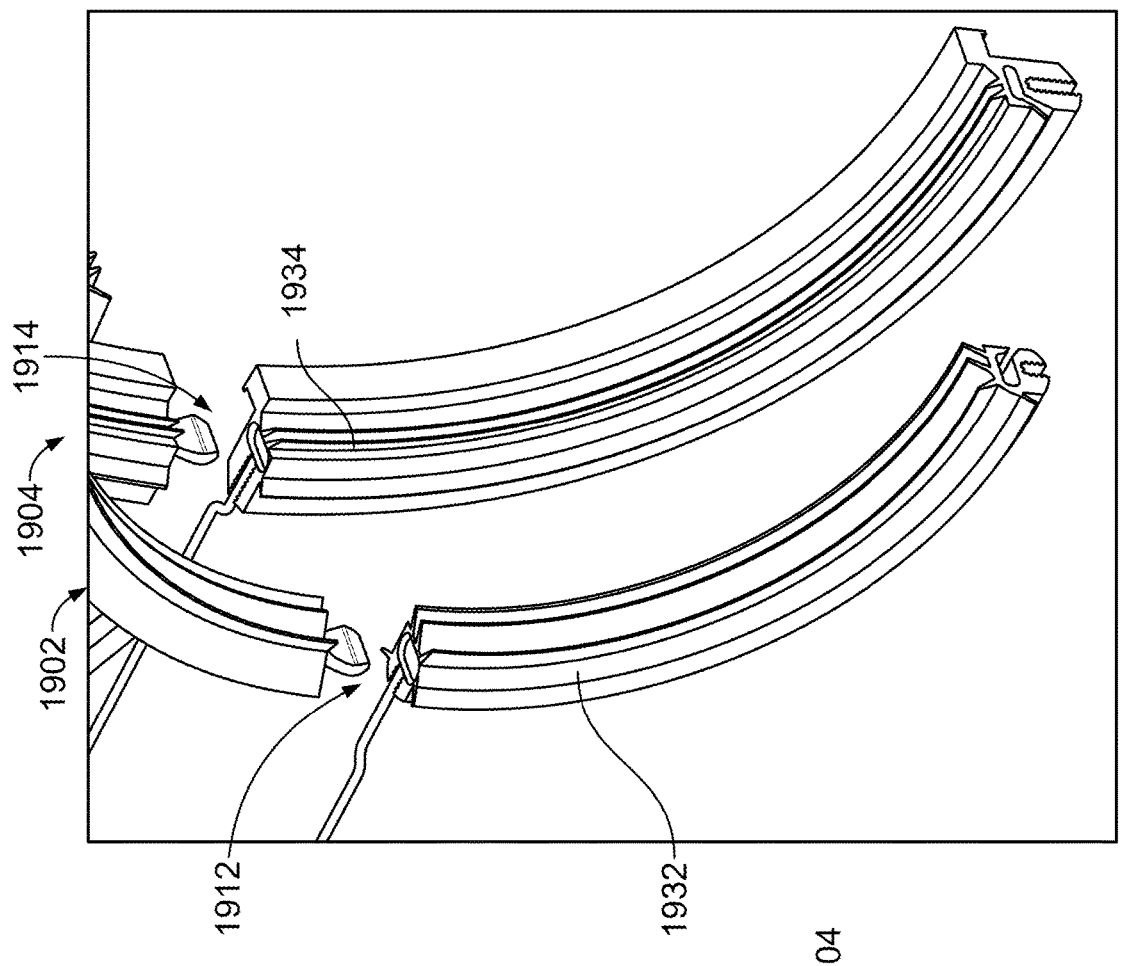
FIG. 20 illustrates a partial cross-sectional wire-frame view of a drainage system of a gearcase seal assembly in accordance with one embodiment.

FIG. 20 illustrates a partial cross-sectional wire-frame view of another drainage system of a gearcase seal assembly in accordance with one embodiment. The gearcase seal assembly includes an inboard seal body 1902 and an outboard seal body 1904. In the illustrated embodiment of FIG. 20, the inboard and outboard seal bodies are not coupled with the gearcase. The inboard seal body is shown having a mating interface 1912 where a first end of the inboard seal body may be operably coupled with a second end of the inboard seal body. The outboard seal body is shown having a mating interface 1914 where a first end of the outboard seal body may be operably coupled with a second end of the outboard seal body. The inboard and outboard seal bodies may include one or more mating interfaces for assembling the seal bodies with the gearcase.

In the illustrated embodiment, the inboard seal body includes a drainage system 1932 that may include one or more conduits or passages that may move fluid within the inboard seal body, and the outboard seal body includes a drainage system 1934 that may include one or more conduits or passages that may move fluid within the outboard seal body. One or both of the drainage systems may move or direct fluid along a perimeter of the inboard and/or outboard seal bodies, respectively, such as toward a bottom-dead-center of one or both of the inboard or outboard seal bodies relative a line of longitude. Alternatively, one or both of the drainage systems of the inboard or outboard seal bodies may direct fluid in one or more other directions or to another location along a perimeter of respective the seal body.

Figure 21:
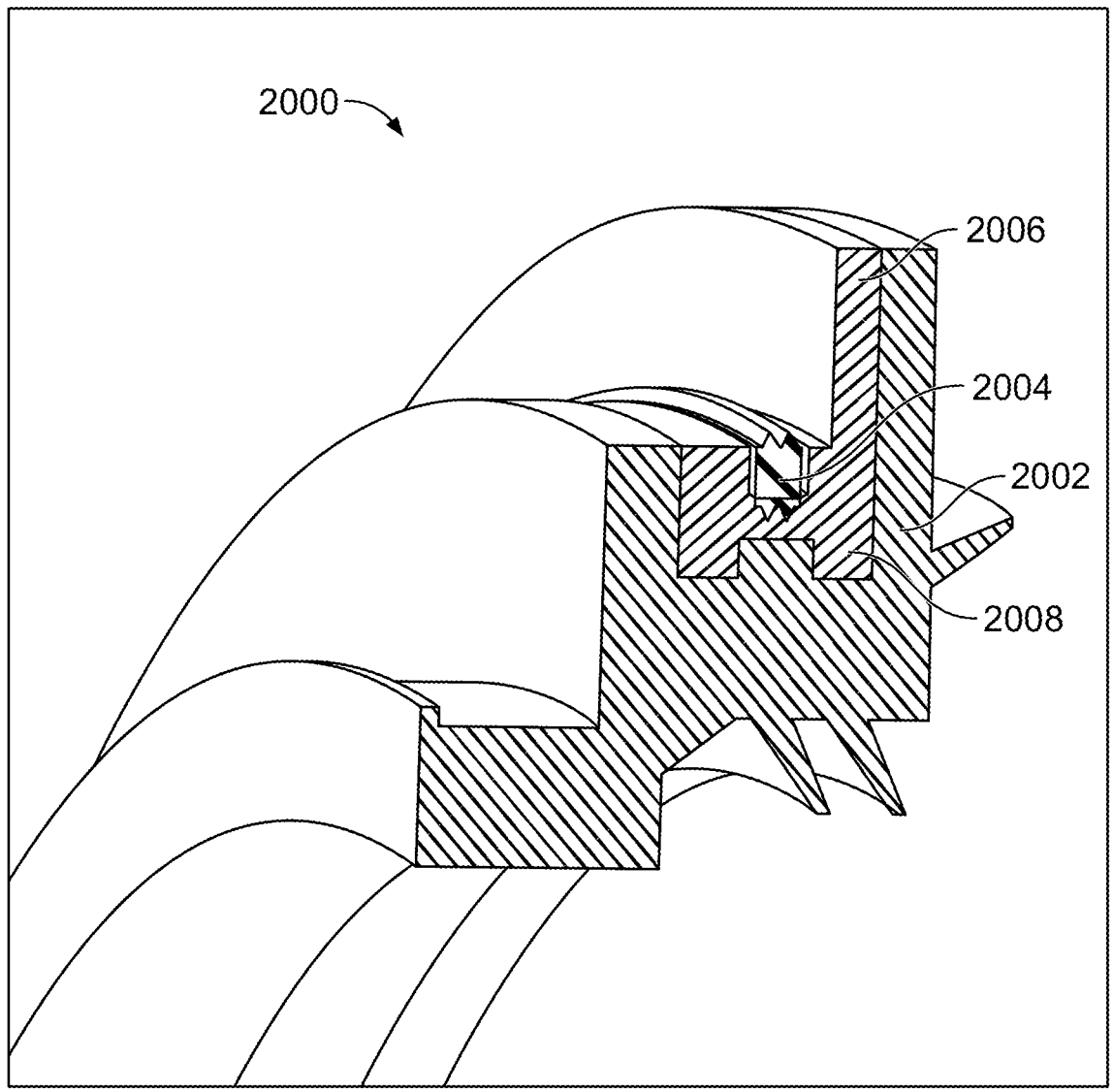
FIG. 21 illustrates a cross-sectional view of a seal body assembly in accordance with one embodiment.

FIG. 21 illustrates a cross-sectional view of a seal body assembly 2000 in accordance with one embodiment. The seal body assembly may represent an inboard seal body or an outboard seal body. The assembly includes a seal body 2002 that includes a pocket 2008. A core structure 2006 may be disposed within, embedded with, or otherwise coupled with the pocket. In the illustrated embodiment, the core structure has a shape that substantially mimics the shape of the pocket. The seal body assembly may include a seal 2004 that may be disposed within a pocket of the core structure. In the illustrated embodiment, the seal body, the core structure, and the seal may extend around a center axis, such as the center axis of the axle shown in FIG. 9. The seal body and the seal may be manufactured of a common or unique flexible materials. Additionally, the core structure may be manufactured of a material that may be harder and/or denser, or the like, than the material of the seal body and the seal. For example, the core structure may be manufactured of a metallic material and may provide structure to the seal body assembly for radial compression and/or axial compression, and the seal body and the seal may be manufactured of softer or flexible materials that may move or adjust responsive to movement of a gearcase that may be assembled with the seal body assembly (not shown).

In one or more embodiments of the subject matter described herein, a gearcase seal assembly includes an inboard seal body extending about a center axis and along the center axis between an interior portion and an exterior portion. The inboard seal body includes an inboard pocket configured to receive a first surface of a gearcase of an axle assembly. The gearcase seal assembly includes an outboard seal body extending about the center axis and along the center axis between an interior portion and an exterior portion. The outboard seal body includes an outboard pocket configured to receive a second surface of the gearcase of the axle assembly. The interior portion of the inboard seal body includes a gutter configured to direct fluid in a direction away from the first surface of the gearcase. The exterior portion of the inboard seal body includes plural fingers disposed outside of the inboard pocket and extending in one or more directions away from the inboard pocket. The interior portion of the outboard seal body includes a gutter configured to direct fluid in a direction away from the second surface of the gearcase. The exterior portion of the outboard seal body includes plural fingers disposed outside of the outboard pocket and extending in one or more directions away from the outboard pocket.

In one or more embodiments of the subject matter described herein, a gearcase assembly includes a gear configured to be coupled with an axle that extends along a center axis. Movement of the gear is configured to control movement of the axle. A gearcase is configured to contain the gear. The gearcase includes a body having at least a first surface and a second surface. The first surface is disposed on a first side of the gearcase and the second surface is disposed on a second side of the gearcase. A gearcase seal assembly includes an inboard seal body and an outboard seal body. The inboard seal body is disposed between the first surface of the gearcase and the gear, and the outboard seal body is disposed between the second surface of the gearcase and the gear. The gearcase seal assembly is configured to reduce an amount of the fluid that is directed out of the gearcase of the axle assembly, and to reduce an amount of debris from entering the gearcase of the axle assembly.

In one or more embodiments of the subject matter described herein, a gearcase seal assembly includes an inboard seal body extending about a center axis and along the center axis between an interior portion and an exterior portion. The inboard seal body includes an inboard pocket configured to receive a first surface of a gearcase of an axle assembly. The gearcase seal assembly includes an outboard seal body extending about the center axis and along the center axis between an interior portion and an exterior portion. The outboard seal body includes an outboard pocket configured to receive a second surface of the gearcase of the axle assembly. The interior portion of the inboard seal body includes a gutter configured to direct fluid in a direction away from the first surface of the gearcase. The exterior portion of the inboard seal body includes plural fingers disposed outside of the inboard pocket and extending in one or more directions away from the inboard pocket. The interior portion of the outboard seal body includes a gutter configured to direct fluid in a direction away from the second surface of the gearcase. The exterior portion of the outboard seal body includes plural fingers disposed outside of the outboard pocket and extending in one or more directions away from the outboard pocket. The inboard and outboard seal bodies are configured to reduce an amount of the fluid that is directed out of the gearcase of the axle assembly and to reduce an amount of debris from entering the gearcase of the axle assembly.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A gearcase seal assembly comprising:
an inboard seal body extending about a center axis and along the center axis between an interior portion of the inboard seal body and an exterior portion of the inboard seal body, the inboard seal body including a first interior gutter finger and a first exterior gutter finger, the inboard seal body comprising an inboard pocket configured to receive a first surface of a gearcase of an axle assembly, the inboard pocket including an inboard snap-in feature configured to receive a base end of the first surface of the gearcase, the inboard snap-in feature configured to maintain a position of the first surface of the gearcase relative to the inboard seal body and control an amount of movement of the first surface of the gearcase relative to the inboard seal body, wherein the first interior gutter finger of the inboard seal body is operably coupled with the first surface of the gearcase; and
an outboard seal body extending about the center axis and along the center axis between an interior portion of the outboard seal body and an exterior portion of the outboard seal body, the outboard seal body including a second interior gutter finger and a second exterior gutter finger, the outboard seal body comprising an outboard pocket configured to receive a second surface of the gearcase of the axle assembly, the outboard pocket including an outboard snap-in feature configured to receive a base end of the second surface of the gearcase, the outboard snap-in feature configured to maintain a position of the second surface of the gearcase relative to the outboard seal body and control an amount of movement of the second surface of the gearcase relative to the outboard seal body, wherein the second interior gutter finger of the outboard seal body is operably coupled with the second surface of the gearcase,
wherein the interior portion of the inboard seal body comprises a first gutter formed by the first interior gutter finger and the first exterior gutter finger of the inboard seal body, the first gutter configured to receive fluid that is directed away from the first surface of the gearcase, the exterior portion of the inboard seal body including plural first fingers disposed outside of the inboard pocket and extending in one or more directions away from inboard pocket, and
wherein the interior portion of the outboard seal body comprises a second gutter formed by the second interior gutter finger and the second exterior gutter finger of the outboard seal body, the second gutter configured to receive the fluid that is directed away from the second surface of the gearcase, the exterior portion of the outboard seal body including plural second fingers disposed outside of the outboard pocket and extending in one or more directions away from the outboard pocket.

2. The gearcase seal assembly of claim 1, wherein the interior portion of the inboard seal body faces toward the outboard seal body and the exterior portion of the inboard seal body faces away from the outboard seal body, and wherein the interior portion of the outboard seal body faces toward the inboard seal body and the exterior portion of the outboard seal body faces away from the inboard seal body.

3. The gearcase seal assembly of claim 1, wherein one or more of the exterior portion of the inboard seal body or the exterior portion of the outboard seal body comprises one or more conduits configured to direct the fluid in one or more directions about the center axis.

4. The gearcase seal assembly of claim 3, wherein the one or more conduits are configured to direct the fluid in a clockwise direction or a counterclockwise direction about the center axis.

5. The gearcase seal assembly of claim 1, wherein the inboard seal body is formed as a unitary body and the outboard seal body is formed as a unitary body.

6. The gearcase seal assembly of claim 1, wherein the inboard seal body comprises an inboard center passage open to and extending along the center axis, and the outboard seal body comprises an outboard center passage open to and extending along the center axis, wherein the inboard center passage of the inboard seal body and the outboard center passage of the outboard seal body are concentric with each other and about the center axis.

7. The gearcase seal assembly of claim 6, wherein the axle assembly is configured to be disposed within the inboard center passage of the inboard seal body and the outboard center passage outboard seal body.

8. The gearcase seal assembly of claim 1, wherein the inboard and outboard seal bodies are configured to control an amount of the fluid that is directed out of the gearcase of the axle assembly and to control an amount of debris from entering the gearcase of the axle assembly.

9. The gearcase seal assembly of claim 1, wherein a first finger of the plural first fingers of the inboard seal body extends in a first radial direction, and a second finger of the plural first fingers of the inboard seal body extends in a second, different radial direction relative to the center axis.

10. The gearcase seal assembly of claim 1, wherein a first finger of the plural second fingers of the outboard seal body extends in a first radial direction, and a second finger of the plural second fingers of the outboard seal body extends in a second, different radial direction relative to the center axis.

11. The gearcase seal assembly of claim 1, wherein the inboard pocket includes a lead-in feature such that a size of an opening of the inboard pocket is larger than an interior of the inboard pocket.

12. The gearcase seal assembly of claim 1, wherein the outboard pocket includes a lead-in feature such that a size of an opening of the outboard pocket is larger than an interior of the outboard pocket.

13. The gearcase seal assembly of claim 1, wherein the inboard seal body extends in a first radial plane relative to the center axis, and the outboard seal body extends in a different, second radial plane relative to the center axis.

14. A gearcase assembly comprising:
a gear configured to be coupled with an axle of an axle assembly that extends along a center axis, wherein movement of the gear is configured to control movement of the axle;
a gearcase configured to contain the gear, the gearcase comprising a body having at least a first surface and a second surface, the first surface disposed on a first side of the gearcase and the second surface disposed on a second side of the gearcase; and
a gearcase seal assembly comprising an inboard seal body and an outboard seal body, wherein the inboard seal body is configured to be disposed between the first surface of the gearcase and the gear, the inboard seal body including a first interior gutter finger configured to be operably coupled with the first surface of the gearcase, the inboard seal body including an inboard pocket including an inboard snap-in feature configured to receive a base end of the first surface of the gearcase, the inboard snap-in feature configured to maintain a position of the first surface of the gearcase relative to the inboard seal body,
the outboard seal body configured to be disposed between the second surface of the gearcase and the gear, the outboard seal body including a second interior gutter finger configured to be operably coupled with the second surface of the gearcase, the outboard seal body including an outboard pocket including an outboard snap-in feature configured to receive a base end of the second surface of the gearcase, the outboard snap-in feature configured to maintain a position of the second surface of the gearcase relative to the outboard seal body, and
the gearcase seal assembly configured to control an amount of fluid that is directed out of the gearcase of the axle assembly and to control an amount of debris from entering the gearcase of the axle assembly.

15. The gearcase assembly of claim 14, wherein the inboard seal body includes an interior portion and an exterior portion, wherein the interior portion of the inboard seal body comprises a first gutter formed by the first interior gutter finger and a first exterior gutter finger of the inboard seal body, the first interior gutter finger configured to direct fluid in a direction away from the first surface of the gearcase and toward the first gutter, the exterior portion of the inboard seal body including plural first fingers disposed outside of an inboard pocket and extending in one or more directions away from the inboard pocket.

16. The gearcase assembly of claim 15, wherein a first finger of the plural first fingers of the inboard seal body extends in a first radial direction, and a second finger of the plural first fingers of the inboard seal body extends in a second, different radial direction relative to the center axis.

17. The gearcase assembly of claim 14, wherein the outboard seal body includes an interior portion and an exterior portion, wherein the interior portion of the outboard seal body comprises a second gutter formed by the second interior gutter finger and a second exterior gutter finger of the outboard seal body, the second interior gutter finger configured to direct the fluid in a direction away from the second surface of the gearcase and toward the second gutter, the exterior portion of the outboard seal body including plural second fingers disposed outside of an outboard pocket and extending in one or more directions away from the outboard pocket.

18. The gearcase assembly of claim 17, wherein a first finger of the plural second fingers of the outboard seal body extends in a first radial direction, and a second finger of the plural second fingers of the outboard seal body extends in a second, different radial direction relative to the center axis.

19. The gearcase assembly of claim 14, wherein the inboard seal body comprises an inboard pocket configured to receive the first surface of the gearcase, and wherein the outboard seal body comprises an outboard pocket configured to receive the second surface of the gearcase of the axle assembly.

20. A gearcase assembly for a gear configured to be coupled with an axle that extends along a center axis, the gearcase assembly comprising:
   a gearcase comprising a body having at least a first surface and a second surface, the first surface disposed on a first side of the gearcase and the second surface disposed on a second side of the gearcase; and
   a gearcase seal assembly comprising an inboard seal body and an outboard seal body, wherein the inboard seal body is configured to be disposed between the first surface of the gearcase and the gear, and the outboard seal body is configured to be disposed between the second surface of the gearcase and the gear,
   wherein the inboard seal body includes an interior portion and an exterior portion, wherein the interior portion of the inboard seal body comprises a first gutter formed by a first interior gutter finger and a first exterior gutter finger of the inboard seal body, the first gutter configured to receive at least some fluid directed away from the first surface of the gearcase by the first interior gutter finger of the inboard seal body, the exterior portion of the inboard seal body including plural first fingers disposed outside of an inboard pocket and extending in one or more directions away from the inboard pocket, the inboard pocket including an inboard snap-in feature configured to receive a portion of the first surface of the gearcase to maintain a position of the gearcase relative to the inboard seal body,
   wherein the outboard seal body includes an interior portion and an exterior portion, wherein the interior portion of the outboard seal body comprises a second gutter formed by a second interior gutter finger and a second exterior gutter finger of the outboard seal body, the second gutter configured to receive at least some of the fluid directed away from the second surface of the gearcase by the second interior gutter finger of the outboard seal body, the exterior portion of the outboard seal body including plural second fingers disposed outside of an outboard pocket and extending in one or more directions away from the outboard pocket, the outboard pocket including an outboard snap-in feature configured to receive a portion of the second surface of the gearcase to maintain a position of the gearcase relative to the outboard seal body, and
   wherein the gearcase seal assembly is configured to control an amount of the fluid that is directed out of the gearcase of an axle assembly and to control an amount of debris from entering the gearcase of the axle assembly.

* * * * *